(12) United States Patent
Zhang et al.

(10) Patent No.: US 11,685,547 B2
(45) Date of Patent: Jun. 27, 2023

(54) AUTONOMOUS CATAPULT-ASSISTED TAKE-OFF, RECYCLING, AND REUSE DEVICE AND METHOD OF FLAPPING-WING UNMANNED AERIAL VEHICLE (UAV)

(71) Applicant: SOUTHEAST UNIVERSITY, Nanjing (CN)

(72) Inventors: Jun Zhang, Nanjing (CN); Maozeng Zhang, Nanjing (CN); Aiguo Song, Nanjing (CN); Fanzhang Huang, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/693,365

(22) Filed: Mar. 13, 2022

(65) Prior Publication Data

US 2022/0194625 A1     Jun. 23, 2022

Related U.S. Application Data

(63) Continuation of application No. PCT/CN2021/101928, filed on Jun. 24, 2021.

(30) Foreign Application Priority Data

Aug. 31, 2020   (CN) .............................. 202010895921

(51) Int. Cl.
*B64F 1/06*     (2006.01)
*B64U 70/70*    (2023.01)
(Continued)

(52) U.S. Cl.
CPC ................ *B64F 1/06* (2013.01); *B64C 33/00* (2013.01); *B64C 39/024* (2013.01);
(Continued)

(58) Field of Classification Search
CPC ........... B64F 1/06; B64U 70/70; B64U 80/10
See application file for complete search history.

(56) References Cited

U.S. PATENT DOCUMENTS

| | | | | |
|---|---|---|---|---|
| 8,276,844 B2* | 10/2012 | Kariv | ..................... | B64F 1/029 244/110 E |
| 8,573,536 B2* | 11/2013 | McGeer | ................... | B64F 5/00 244/114 R |
| 2019/0100315 A1 | 4/2019 | Theiss | | |

FOREIGN PATENT DOCUMENTS

| | | |
|---|---|---|
| CN | 201525506 U | 7/2010 |
| CN | 102372091 A | 3/2012 |

(Continued)

*Primary Examiner* — Nicholas McFall
(74) *Attorney, Agent, or Firm* — Bayramoglu Law Offices LLC

(57) ABSTRACT

An autonomous catapult-assisted take-off, recycling, and reuse device and method of a flapping-wing unmanned aerial vehicle (UAV) are provided. The device includes a base, an attitude adjusting mechanism, a catapult mechanism, a recycling mechanism, a control processing unit, a power supply module, and a sensor unit, where the attitude adjusting mechanism includes a connector, a counterweight, an adjusting motor, an attitude adjusting input gear, an attitude adjusting output gear, an attitude adjusting output gear shaft, and an installation platform; the catapult mechanism includes a catapult motor, a catapult motor frame, a pulley, a pull rope, a winch, a pull rope fixing part, a flapping-wing aircraft fixing part, two slide bars, two compression springs, and a catapult gear set; and the recycling mechanism includes a recycling motor, a recycling mechanical arm, a recycling platform, two sprockets, and a recycling gear set.

9 Claims, 24 Drawing Sheets

(51) Int. Cl.
*B64C 33/00* (2006.01)
*B64C 39/02* (2023.01)
*B64U 10/40* (2023.01)

(52) U.S. Cl.
CPC ............ *B64C 39/028* (2013.01); *B64U 10/40* (2023.01); *B64U 70/70* (2023.01)

(56) References Cited

FOREIGN PATENT DOCUMENTS

| | | |
|---|---|---|
| CN | 103693206 A | 4/2014 |
| CN | 104015828 A | 9/2014 |
| CN | 108248886 A | 7/2018 |
| CN | 108312137 A | 7/2018 |
| CN | 108313324 A | 7/2018 |
| CN | 109436364 A | 3/2019 |
| CN | 110316398 A | 10/2019 |
| CN | 112046741 A | 12/2020 |
| DE | 102018004549 B3 | 10/2019 |
| JP | 2002085860 A | 3/2002 |

* cited by examiner

S-5

S-6

S-7

S-8

S-9

S-10

S-11

S-12

AUTONOMOUS CATAPULT-ASSISTED TAKE-OFF, RECYCLING, AND REUSE DEVICE AND METHOD OF FLAPPING-WING UNMANNED AERIAL VEHICLE (UAV)

CROSS REFERENCE TO THE RELATED APPLICATIONS

This application is the continuation application of International Application No. PCT/CN2021/101928, filed on Jun. 24, 2021, which is based upon and claims priority to Chinese Patent Application No. 202010895921.4, filed on Aug. 31, 2020, the entire contents of which are incorporated herein by reference.

TECHNICAL FIELD

The present invention relates to the cross-fields of bionics, mechanics, robotics, instrument science, control science, computer science, sensor technology, and the like, and relates to an autonomous catapult-assisted take-off, recycling and reuse device and method of a flapping-wing unmanned aerial vehicle (UAV).

BACKGROUND

Compared with fixed-wing and rotary-wing unmanned aerial vehicles (UAVs), flapping-wing UAVs have the advantages such as high efficiency, agility, concealment, can perform tasks such as reconnaissance and detection in a large area, security inspection, and post-disaster search, can be widely used in the military field, and also have excellent application prospects in civilian fields such as agriculture and forestry.

At present, the take-off of flapping-wing UAVs is still a problem. The take-off method of flapping-wing UAVs directly affects the reliability and stability of the UAVs and enables them to achieve large-scale applications of flapping-wing UAVs. Due to the advantages such as no need for a runway, controllable take-off angle, simple and safe operation, and ability to work in complex mountain and forest environments, catapult-assisted take-off has become one of the main take-off methods for UAVs in recent years, greatly relaxing the restrictions on the use of UAVs, improving environmental adaptability, and expanding the application fields of flapping-wing UAVs. In "A small UAV take-off catapult" disclosed in the invention patent application with an application number 201711406496.2, a catapult rope is tightened by a hoist, one end of the catapult rope is fixed to a frame, and the other end of the catapult rope is connected to a trolley; the catapult rope has certain elastic potential energy after being tightened; by unlocking a fixing lock of the trolley, the elastic potential energy of the catapult rope is converted into kinetic energy to drive a UAV mounted on the trolley to generate an acceleration; and when reaching a certain speed, the UAV leaves the trolley and takes off. Although the above-mentioned "A small UAV take-off catapult" can realize take-off of the UAV, it still has the problems of complex structure, difficulty in installation, inconvenience in carrying, and non-adjustable catapult-assisted take-off angle, and is unable to work in a complex environment of the field.

A recycling system for flapping-wing UAVs is related to the safe recycling and reuse of the flapping-wing UAVs and is a necessary prerequisite for fully realizing the value of the UAVs. However, accidents are prone to occur during the recycling process, which may cause damage to the flapping-wing UAVs or injury to personnel, resulting in severe consequences. Therefore, whether the recycling system for the flapping-wing UAVs can safely and reliably recycle the flapping-wing UAVs is a very critical index.

At present, launch systems and recycling systems for UAVs in China are mostly isolated. As a result, there are problems such as large volume, long launch period, insufficient reliability, and low recycling efficiency, and human participation is required throughout the process. Therefore, integrating launch and recycling links of the UAVs into one system and reducing the volume as much as possible has become an urgent problem to be solved. "An integrated operation vehicle for take-off and recycling of UAVs" disclosed in the invention patent application with an application number 201910711298.X provides an integrated operation vehicle suitable for catapult-assisted take-off and lanyard recycling of UAVs. Although the integrated operation vehicle can realize functions, it is bulky and needs to be transported by a trailer, and has the defect of poor privacy. "An autonomous loop launch and recycling device for UAVs" disclosed in the invention patent application with an application number 201310752444.6 is not suitable for catapult-assisted take-off and recycling of flapping-wing UAVs due to a complex structure and the particularity of its attitude adjusting mechanism either.

In view of the problems about catapult-assisted take-off, recycling, and reuse of flapping-wing UAVs at present, the present invention patent overcomes the shortcomings of various catapult systems and recycling systems in the above-mentioned patents, comprehensively considers all links from catapult-assisted take-off to recycle and to reload, and adopts a space expandable mechanism, thereby providing an autonomous catapult-assisted take-off, recycling and reuse device and method of a flapping-wing UAV, which has a particular helpful effect on expanding the application range and scenarios of flapping-wing UAVs.

SUMMARY

The technical problem to be solved by the present invention is to overcome a complex structure, a long launch period, difficulty in the adjustment of a catapult angle, a large recycling system volume, insufficient reliability, and low recycling efficiency of a catapult-assisted take-off system of a flapping-wing unmanned aerial vehicle (UAV), and design a device and method for autonomous catapult-assisted take-off, recycling, and reuse of a flapping-wing UAV.

In order to solve the above problems, the present invention provides an autonomous catapult-assisted take-off, recycling and reuse device of a flapping-wing unmanned aerial vehicle (UAV), comprising a base, an attitude adjusting mechanism, a catapult mechanism, a recycling mechanism, a control processing unit, a sensor unit, and a power supply module, wherein the attitude adjusting mechanism is installed on a top of the base; the catapult mechanism and the recycling mechanism are installed on an upper part of the attitude adjusting mechanism; the attitude adjusting mechanism, the catapult mechanism, and the recycling mechanism are all connected to the control processing unit; and the attitude adjusting mechanism, the catapult mechanism, the recycling mechanism, the control processing unit and the sensor unit are all connected to the power supply module;

the catapult mechanism comprises a catapult motor frame, a catapult motor, a catapult input gear, a toothless gear, a toothless gear shaft, a winch gear, a winch gear shaft, a winch, a left slide bar, a right slide bar, a left compression spring, a right compression spring, a pull rope fixing slide block, a flapping-wing aircraft fixing part, a pulley shaft, a pulley and a pull rope; the catapult motor frame is fixed to a top of an installation platform, and the catapult motor is fixedly connected to the catapult motor frame; the catapult input gear is installed on an output shaft of the catapult motor, and meshes with a toothed half of the toothless gear; the toothless gear is fixedly connected to the toothless gear shaft; the winch gear is fixedly connected to the winch gear shaft and meshes with a toothless half of the toothless gear; the toothless gear shaft and the winch gear shaft are both connected to the catapult motor frame through bearings, and can rotate relative to the catapult motor frame; the winch is fixed to the winch gear and is coaxial with same; the left slide bar and the right slide bar are parallel, and rear ends of the left slide bar and the right slide bar are both fixed to the installation platform; the left compression spring is coaxially sleeved over an outer surface of the left slide bar, and a rear end of the left compression spring is fixed to the installation platform; the right compression spring is coaxially sleeved over an outer surface of the right slide bar, and a rear end of the right compression spring is fixed to the installation platform; a front end of the left compression spring and a front end of the right compression spring are both fixedly connected to the pull rope fixing slide block; the flapping-wing aircraft fixing part is provided with two bilaterally symmetrical through-holes, which are respectively sleeved over the left slide bar and the right slide bar; the flapping-wing aircraft fixing part abuts against the pull rope fixing slide block; the pulley shaft is fixed to the installation platform, and the pulley is sleeved over the pulley shaft; one end of the pull rope is fixedly connected to the pull rope fixing slide block, and the other end of the pull rope passes through a round hole in the installation platform, goes around the pulley and is fixed to the winch;

the recycling mechanism comprises a recycling motor, a recycling gear transmission mechanism, highly elastic cloth, a recycling platform frame, a sprocket I, a sprocket II and a recycling mechanical arm; the installation platform is provided with a plurality of through-holes for installing the recycling motor, the recycling gear transmission mechanism and the recycling mechanical arm; the recycling platform frame is a highly elastic steel sheet; the recycling platform frame is provided with square through-holes every the same distance for meshing with the sprocket I and the sprocket II; a bottom side of the installation platform is provided with two bilaterally symmetrical d-shaped slots, and outer surfaces of front ends of the slots are both provided with boss stoppers; an edge of the highly elastic cloth wraps the recycling platform frame, and both ends of the highly elastic cloth are provided with round through-holes for being sleeved over the boss stoppers on the outer surfaces of the front ends of the d-shaped slots of the installation platform; two ends of the recycling platform frame are fixed with two left and right columns respectively through the two d-shaped slots of the installation platform; a cuboid notch is formed in the middle of each of the two d-shaped slots, and is used for the sprocket I and the sprocket II to mesh with the recycling platform frame; and the power supply module provides energy for the attitude adjusting mechanism, the catapult mechanism, the recycling mechanism, the sensor unit, and the control processor.

To achieve the foregoing objective, the attitude adjusting mechanism comprises a connector, a counterweight, a base root, an attitude adjusting motor, an attitude adjusting input gear, an attitude adjusting output gear, an attitude adjusting output gear shaft and the installation platform; a front end of the connector is installed at the top of the base, the counterweight is installed at a rear end of the connector, and the base root is installed on an upper part of the connector; the attitude adjusting motor is installed on the base root, and the attitude adjusting input gear is fixedly connected to an output shaft of the attitude adjusting motor; the attitude adjusting input gear meshes with the attitude adjusting output gear; the attitude adjusting output gear is fixedly connected to the attitude adjusting output gear shaft; and the attitude adjusting output gear shaft is installed on the base root through a bearing, and is parallel to the output shaft of the attitude adjusting motor.

To achieve the foregoing objective, the base comprises three foot pads, namely a right foot pad, a left foot pad and a rear foot pad, three foot tubes, namely a right foot tube, a left foot tube and a rear foot tube, a foot tube restraint, a middle shaft adapter, a middle shaft locking knob, a middle shaft, a pitch adjusting handle and a connector locking knob; the foot pads are respectively installed at lower ends of the corresponding foot tubes and are in contact with the ground; three outer sleeves of the foot tube restraint are respectively connected to the three foot tubes, and an inner sleeve of the foot tube restraint is connected to a bottom end of the middle shaft adapter; an upper end of the middle shaft adapter is connected to the three foot tubes, and a lower end of the middle shaft is sheathed in the middle shaft adapter, and is fixed by the middle shaft locking knob; an upper end of the middle shaft is connected to the pitch adjusting handle; and the pitch adjusting handle is connected to the connector locking knob.

To achieve the foregoing objective, the recycling gear transmission mechanism comprises a recycling input gear, a primary transmission gear shaft, a secondary transmission gear shaft, a recycling output gear shaft I, a recycling output gear shaft II, a primary transmission gear, a secondary transmission gear, a recycling output gear I and a recycling output gear II; the recycling input gear is installed on an output shaft of the recycling motor and meshes with the primary transmission gear; the primary transmission gear is fixedly connected to the primary transmission gear shaft and meshes with the secondary transmission gear and the recycling output gear I; the recycling output gear I is fixedly connected to one end of the recycling output gear shaft I; the other end of the recycling output gear shaft I is fixedly connected to the sprocket I; the secondary transmission gear is fixedly connected to the secondary transmission gear shaft and meshes with the recycling output gear II; the recycling output gear II is fixedly connected to one end of the recycling output gear shaft II; and the other end of the recycling output gear shaft II is fixedly connected to the sprocket II.

To achieve the foregoing objective, the recycling mechanical arm comprises a joint motor I, a big arm, a joint motor II, a middle arm, a joint motor III, a small arm, a rotating motor, a gripper motor, and a gripper; the joint motor I is fixed at a corresponding position of the installation platform through four round holes of a base of the joint motor I; one end of the big arm is fixed to an output shaft of the joint motor I, and the other end of the big arm is connected to the joint motor II; one end of the middle arm is fixed to an output shaft of the joint motor II, and the other end of the middle arm is connected to the joint motor III; one end of the small arm is fixed to an output shaft of the joint motor III, and the other end of the small arm is coaxially connected to the rotating motor; the gripper motor is fixed to one side of the gripper; a bottom end of the gripper is fixed to an output shaft of the rotating motor.

To achieve the foregoing objective, the sensor unit comprises an encoder, an inclination sensor, and a vision sensor; the encoder is fixed at the end of the recycling motor and transmits an operating status of the recycling motor to the motor controller in real-time to realize speed regulation and start-stop of the recycling motor; the inclination sensor is fixed to an upper surface of a base root of the attitude adjusting mechanism, and is configured to collect an inclination angle of the installation platform during attitude adjustment; the vision sensor is fixed next to a small arm of the recycling mechanical arm, and is configured to detect a real-time position and attitude information of the flapping-wing UAV.

To achieve the foregoing objective, the control processing unit comprises a data collection and storage unit and a processing and control processor; a data processing unit completes the collection of rotation, inclination, and visual information of the sensor unit; and the processing and control processor completes processing of data collected by the sensor unit, and drive control functions of the attitude adjusting motor, the catapult motor and the recycling motor of a system.

To achieve the foregoing objective, the base is of a tripod structure.

An autonomous catapult-assisted take-off, recycling, and reuse method of a flapping-wing unmanned aerial vehicle (UAV), comprising the following steps, A: catapult angle adjustment: after personnel deploy a device, a catapult mechanism is initially in a horizontal attitude; by controlling the forward movement of an attitude adjusting motor, an attitude adjusting input gear, an attitude adjusting output gear, and an attitude adjusting output gear shaft are driven to rotate in turn to realize pitch attitude adjustment of an installation platform; an inclination angle of the installation platform is detected by an inclination sensor, and a rotation angle of the motor is controlled by a control processing unit, so that attitudes of the installation platform and the catapult mechanism are inclined upward, and reach the best catapult angle for the flapping-wing UAV;

B: catapult-assisted take-off: after the catapult angle is adjusted, a catapult motor rotates to drive a catapult input gear to rotate, the catapult input gear further drives a toothless gear to rotate, and the toothless gear drives a winch gear to rotate, and further drive a winch to rotate, thereby continuously winding a pull rope on the winch; while the pull rope is wound, a pull rope fixing slide block is driven to slide on a left slide bar and a right slide bar, thereby compressing a left compression spring and a right compression spring to store elastic potential energy; the catapult motor stops rotating when the toothless gear rotates for one circle to reach a part that does not mesh with the winch gear; driven by the elastic potential energy of the left compression spring and the right compression spring, the pull rope wound on the winch is quickly pulled apart, the pull rope fixing slide block pushes a flapping-wing aircraft fixing part to catapult at high speed, and then catapult-assisted take-off of the flapping-wing UAV can be realized;

C: attitude adjustment and recycling: before the flapping-wing UAV is recycled, the attitude adjusting motor of an attitude adjusting mechanism rotates backward to adjust inclination angles of the installation platform and a recycling mechanism, so that a plane formed by a recycling platform frame and highly elastic cloth is obliquely downward to a certain angle, to facilitate the flapping-wing UAV to detect and land on the highly elastic cloth through a visual positioning method; after the flapping-wing UAV lands on the highly elastic cloth, the attitude adjusting mechanism adjusts the angle to make the recycling platform frame parallel to the horizontal plane; a recycling motor starts to rotate forward and drives a recycling input gear to rotate, the recycling input gear further drives a primary transmission gear to rotate, the primary transmission gear further drives a secondary transmission gear, the primary transmission gear and the secondary transmission gear respectively drive a recycling output gear I and a recycling output gear II to rotate, the recycling output gear I drives a sprocket I to rotate coaxially, and the recycling output gear II drives a sprocket II to rotate coaxially, thus, the recycling platform frame is continuously contracted into d-shaped slots of the installation platform, the highly elastic cloth is blocked by boss stoppers on outer surfaces of front ends of the d-shaped slots of the installation platform, and the flapping-wing UAV slides down to a center of the highly elastic cloth due to gravity; and D: take-off reloading: a vision sensor captures a position of the flapping-wing UAV; a joint motor I, a joint motor II, a joint motor III, and a rotating motor of a recycling mechanical arm work at the same time; the recycling mechanical arm unfolds and rotates a gripper to adapt to an angle of the flapping-wing UAV; a gripper motor works and the gripper grabs the frame of the flapping-wing UAV on a grabbing plane and rotates the frame; and when the plane of the frame of the flapping-wing UAV and a grabbing plane of the recycling mechanical arm coincide, the gripper grabs a grabbing ring on an upper part of the frame of the flapping-wing UAV and re-sleeves the flapping-wing aircraft fixing part over the left and right slide bars of the catapult mechanism to realize take-off reloading.

Beneficial effects: Compared with existing technologies, this application has the following beneficial effects.

(1) An attitude adjusting mechanism designed by the present invention can change the catapult-assisted take-off angle of UAVs and prevents a take-off failure caused by excessive resistance during the catapult-assisted take-off at a horizontal angle, thereby being more suitable for work in a complex terrain environment in the field.

(2) The catapult mechanism designed by the present invention adopts an input gear fixed to an output shaft of a catapult motor to realize transmission through a toothless gear and a winch gear, can realize energy storage and catapult-assisted take-off of flapping-wing UAVs through the cooperation of compression springs and a pull rope, can effectively improve the utilization efficiency of a catapult system, and can also be used for the catapult-assisted take-off of fixed-wing UAVs, in addition, to be used for the catapult-assisted take-off of the flapping-wing UAVs.

(3) A recycling mechanism designed by the present invention can effectively improve the reliability and stability of a recycling system, adopts a space expandable mechanism, can be completely retracted to the bottom of the installation platform when not used, has the advantages of small size, convenient carrying, and quick deployment, can safely and reliably recycle and reload flapping-wing UAVs for take-off, and can greatly improve the practical value of flapping-wing UAVs.

(4) The present invention integrates the catapult and recycling of flapping-wing UAVs in one system, can be conducted with no one involved in the whole process, and can be better qualified for the catapult-assisted take-off, recycling, and reuse of flapping-wing UAVs in situations where the environment is bad or not suitable for the personnel to be on duty for a long time.

Figure 1:
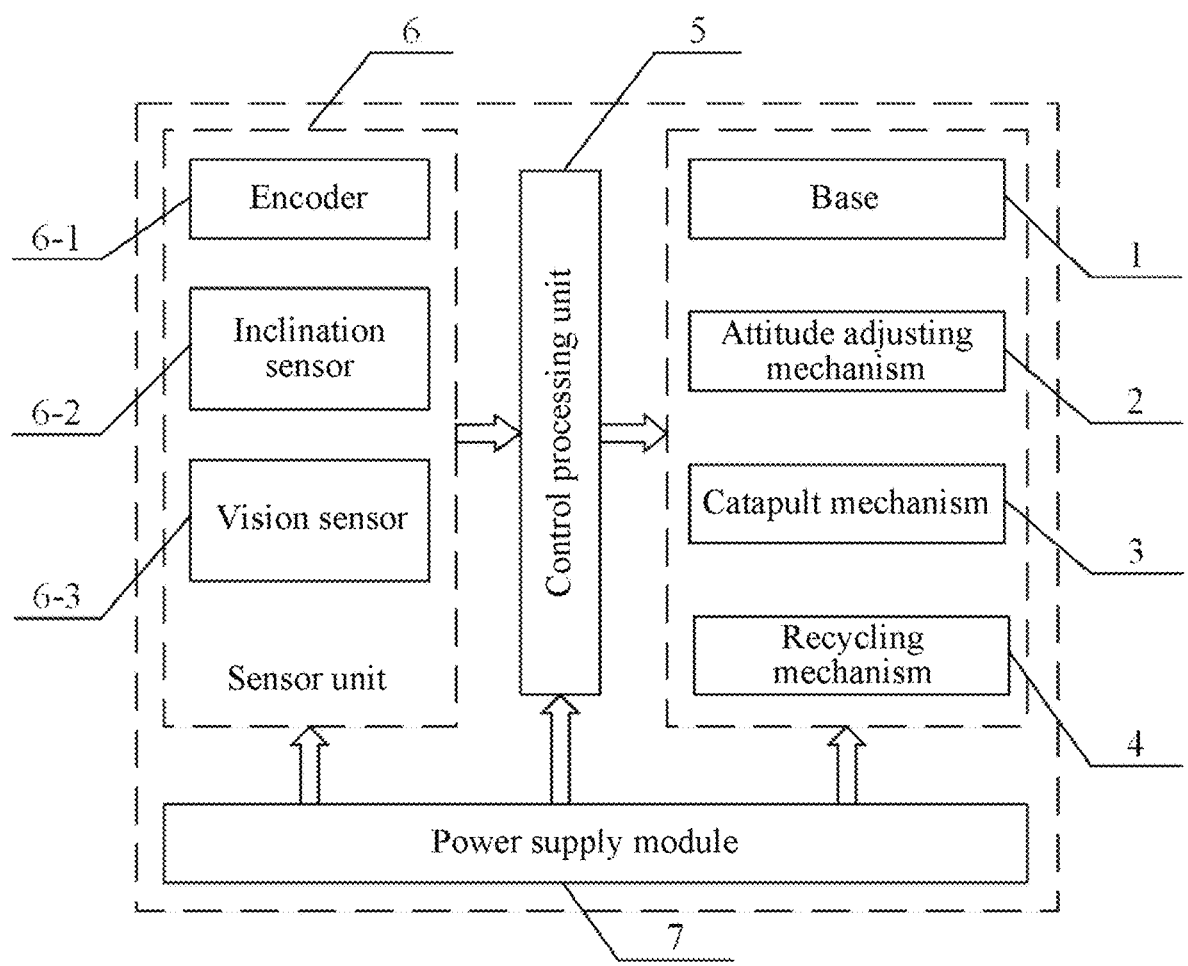
FIG. 1 is a schematic diagram of components of a system of an embodiment of the present invention.
Figure 2:
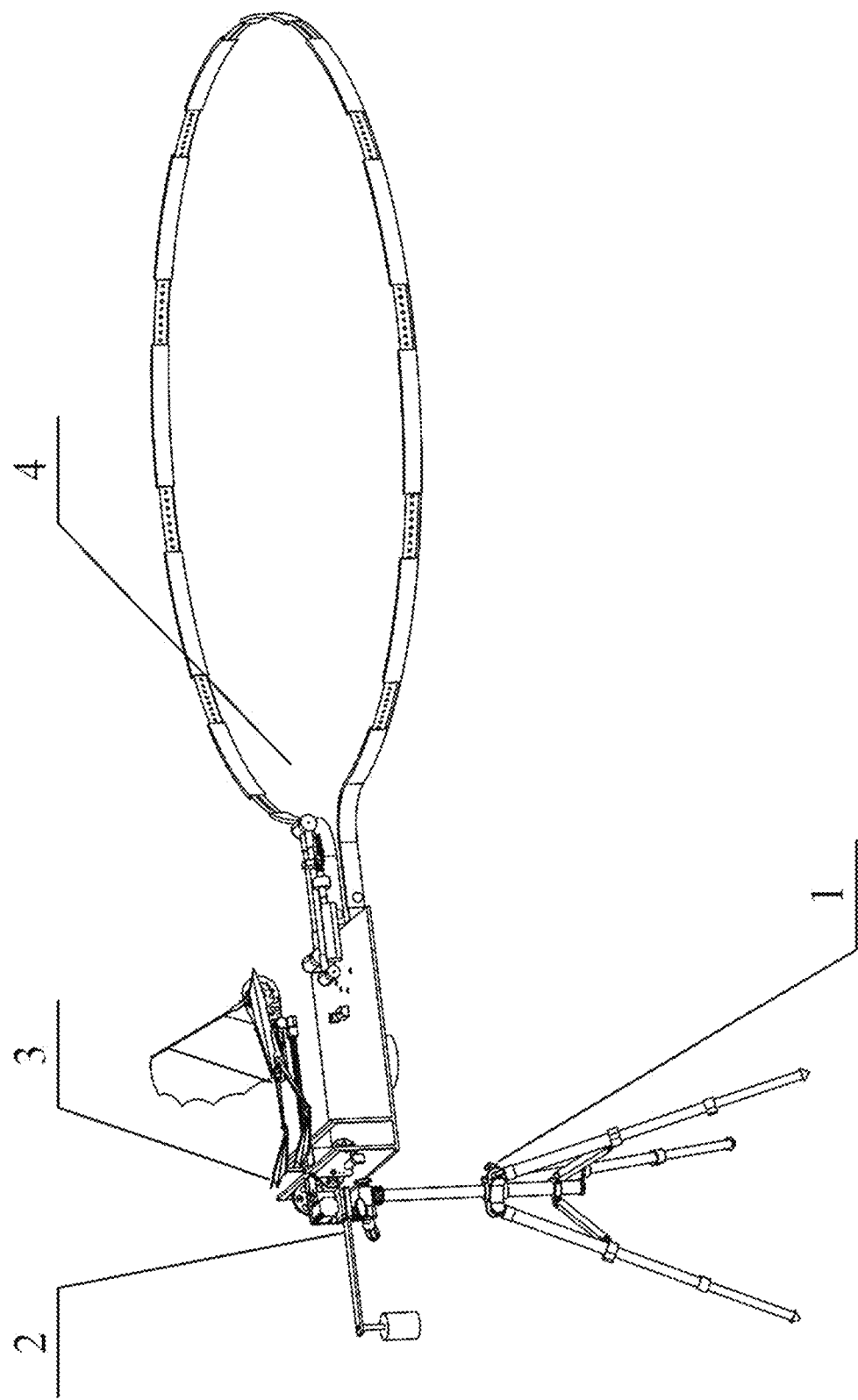
FIG. 2 is a perspective view of an overall mechanism of a device of the present invention.
Figure 3:
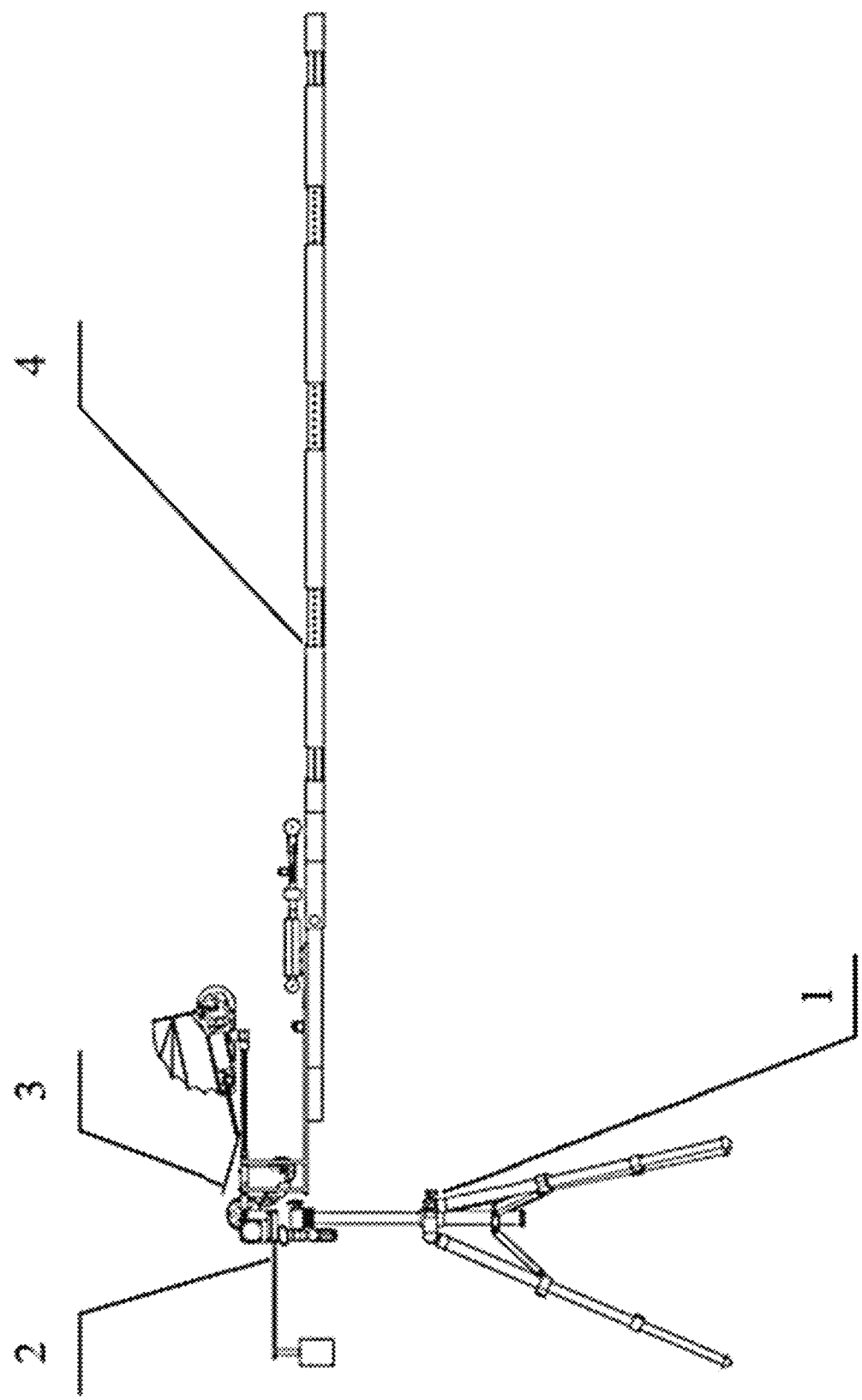
FIG. 3 is a front view of the overall mechanism of the device of the present invention.
Figure 4:
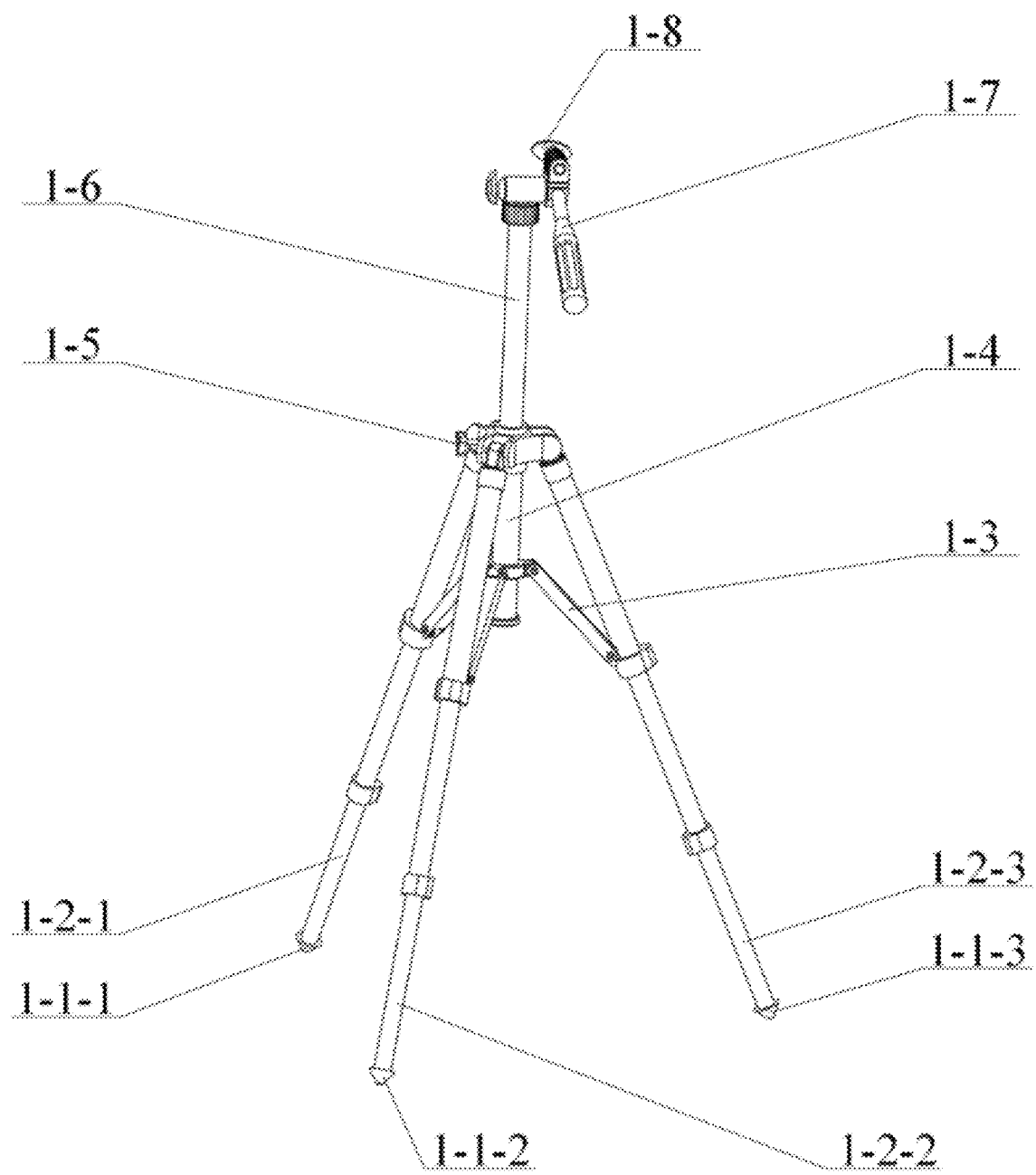
FIG. 4 is a schematic diagram of the base of the device of the present invention.
Figure 5:
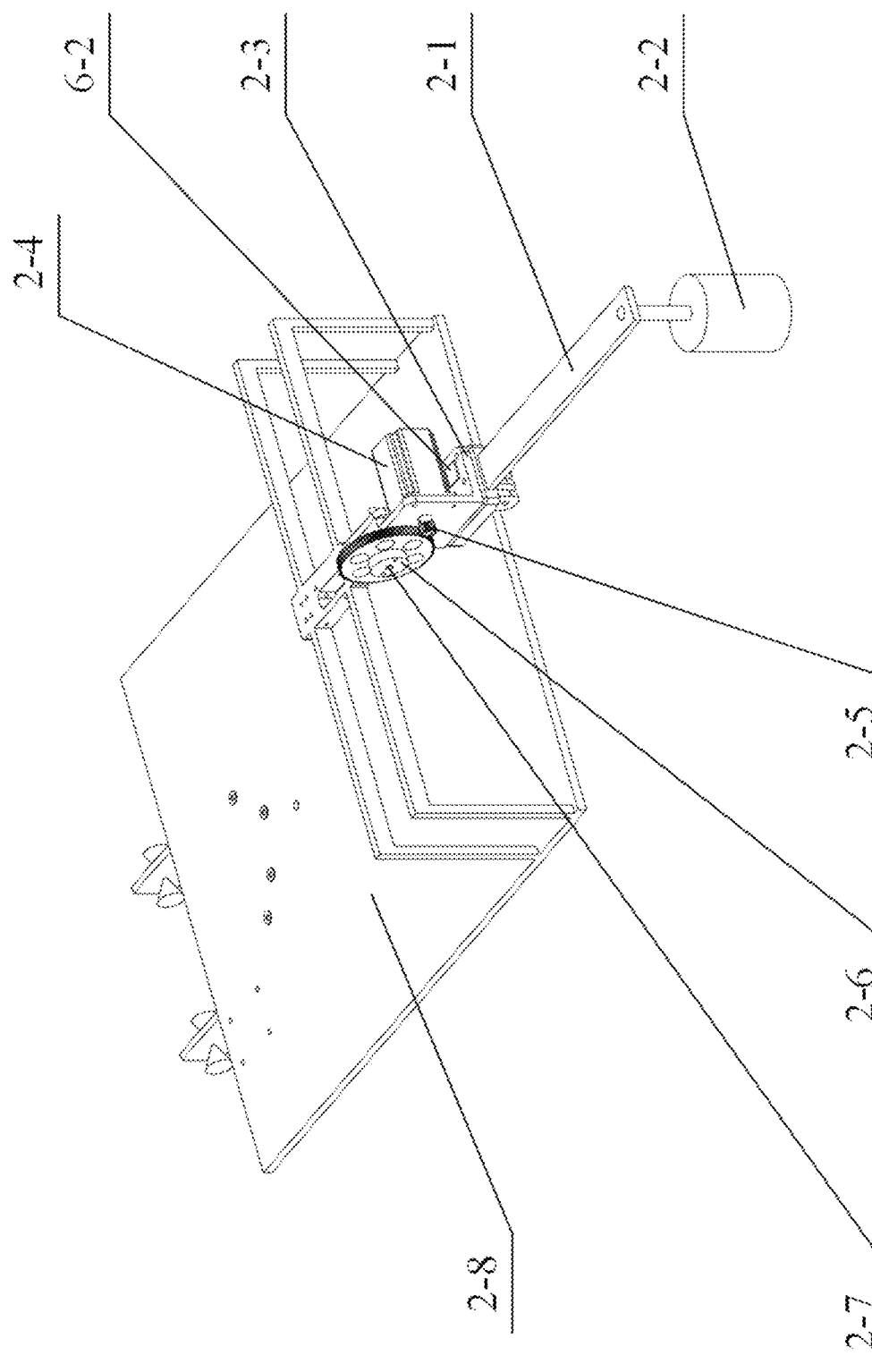
FIG. 5 is a perspective view 1 of an attitude adjusting mechanism of the present invention.
Figure 6:
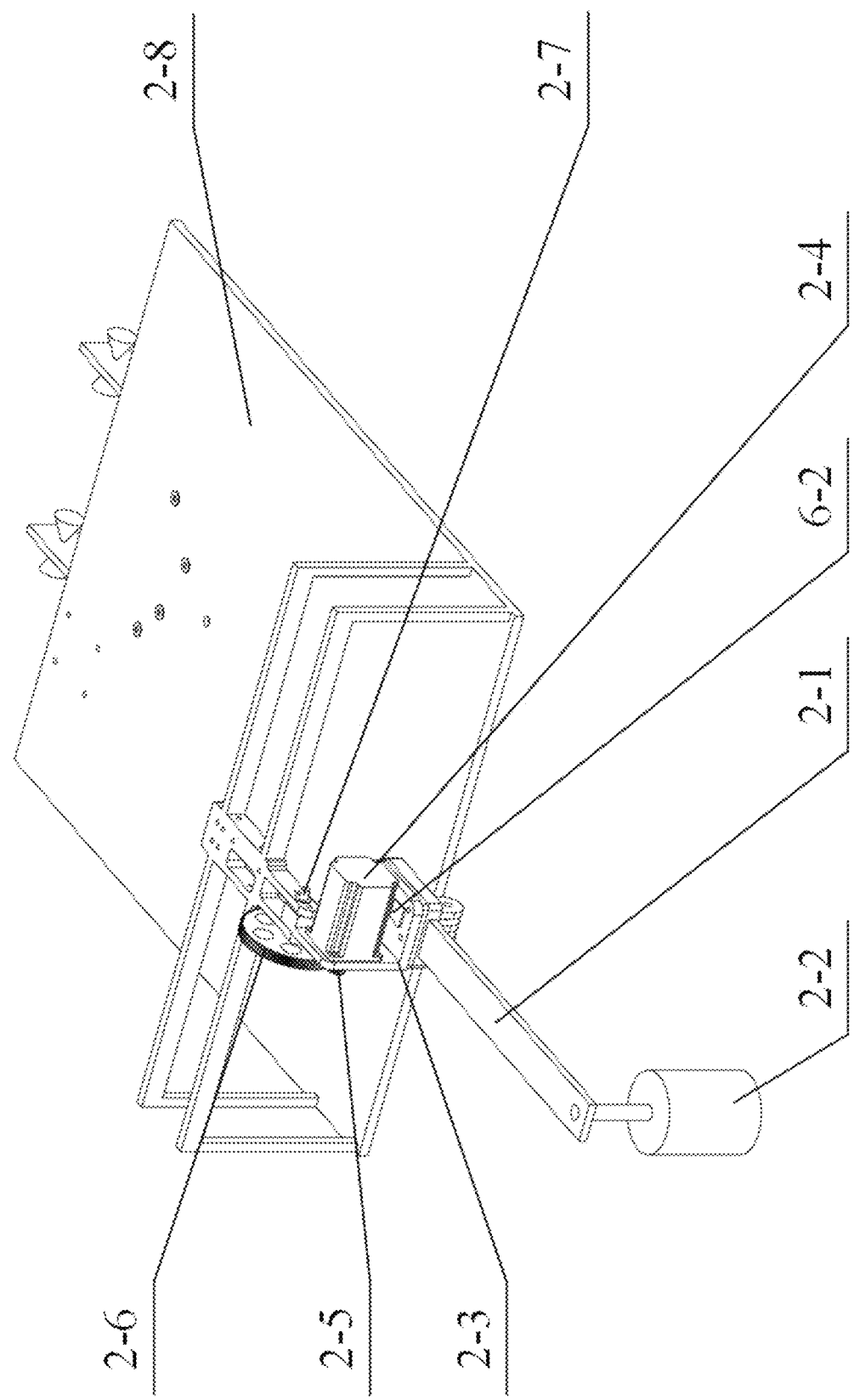
FIG. 6 is a perspective view 2 of the attitude adjusting mechanism of the present invention.
Figure 7:
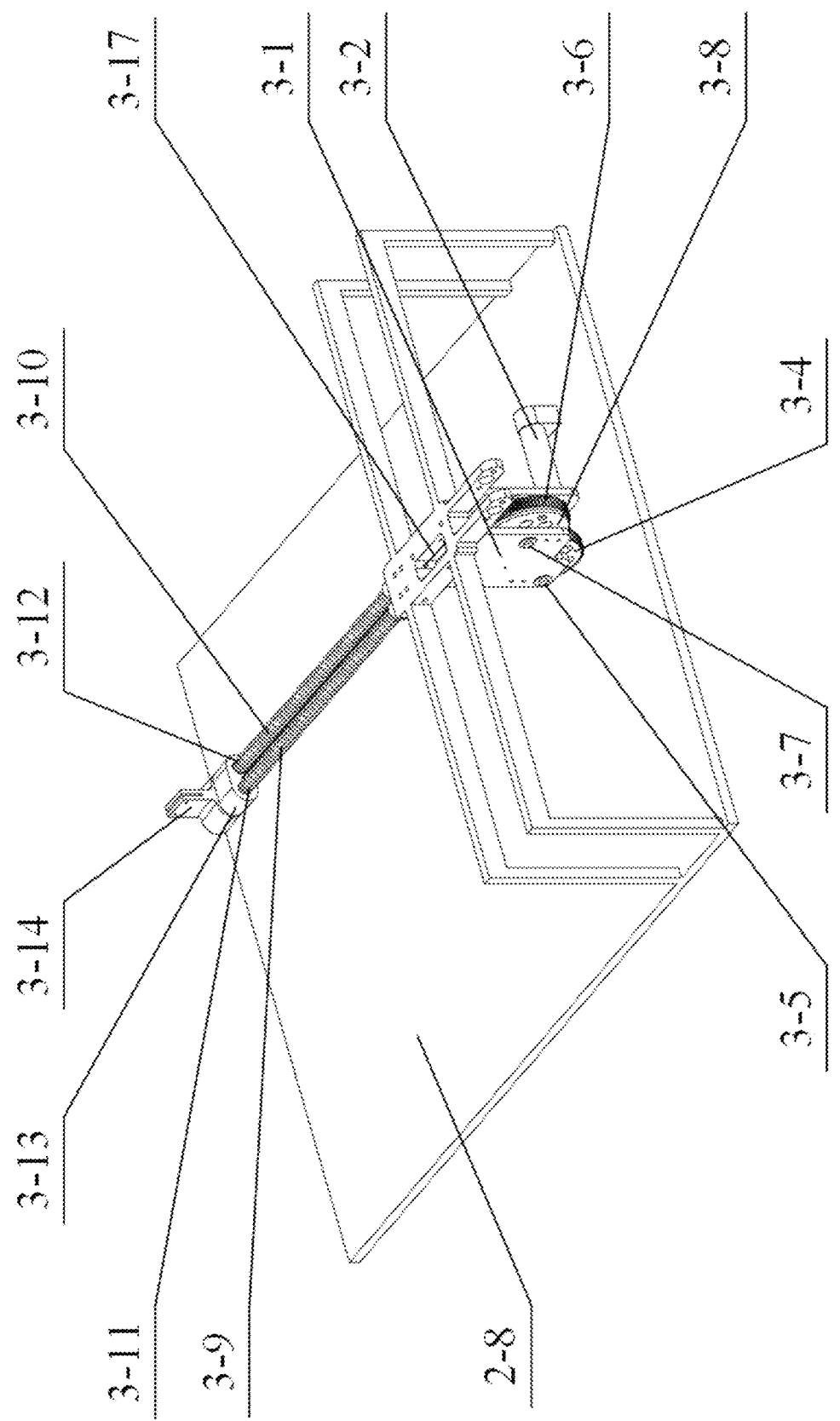
FIG. 7 is a perspective view 1 of a catapult mechanism of the present invention.
Figure 8:
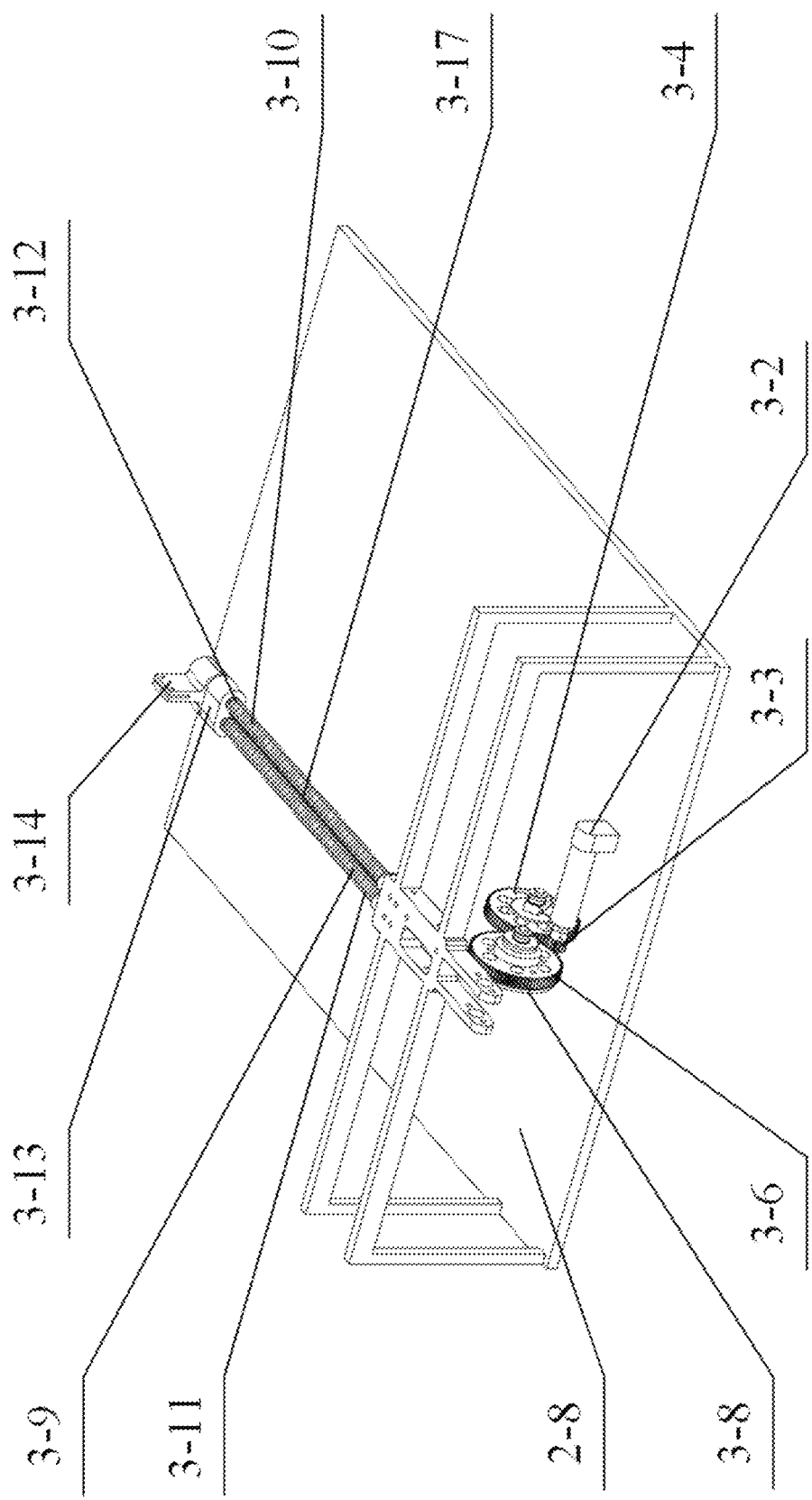
FIG. 8 is a perspective view 2 of the catapult mechanism of the present invention.
Figure 9:
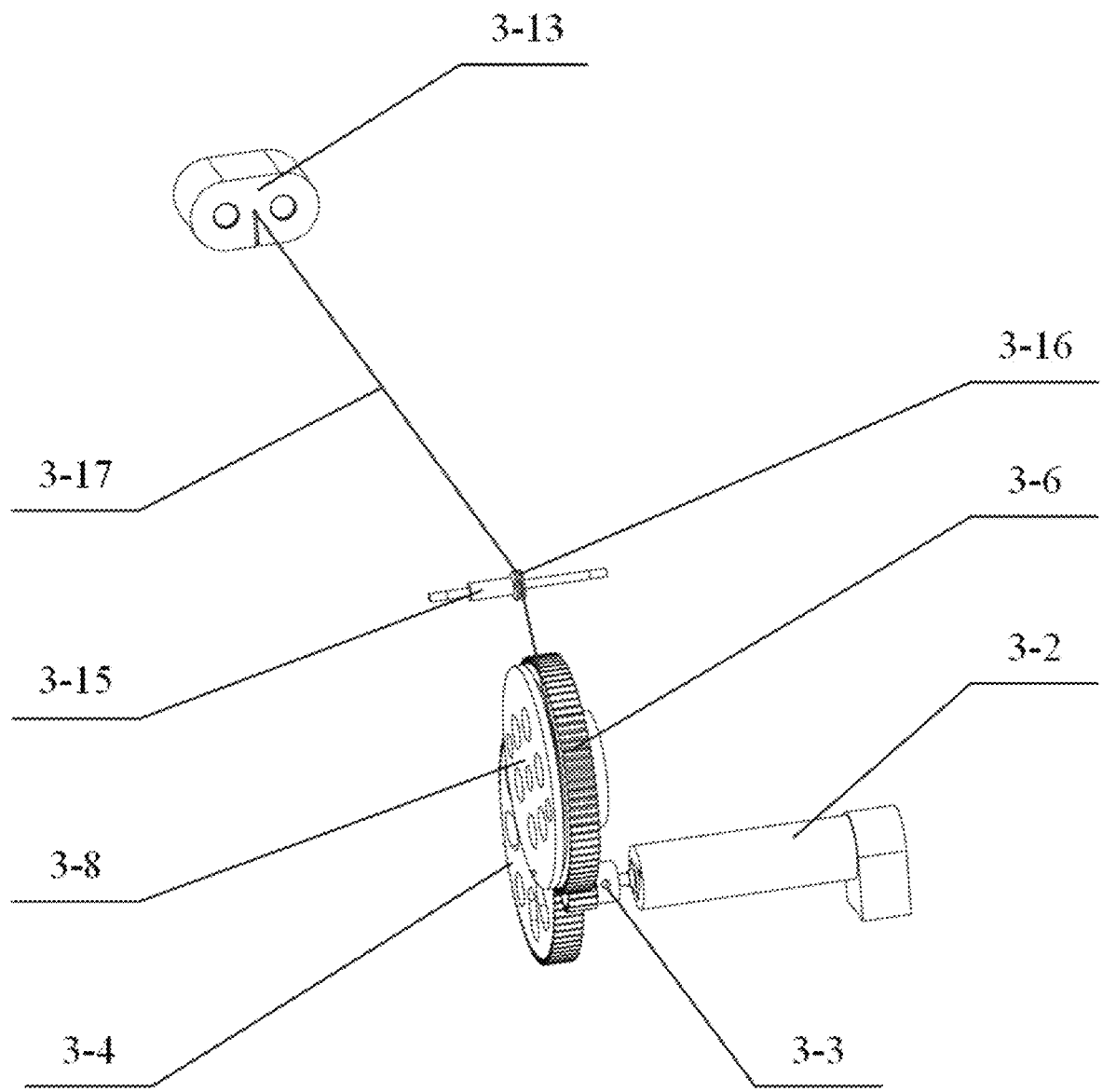
FIG. 9 is a perspective view 3 of the catapult mechanism of the present invention.
Figure 10:
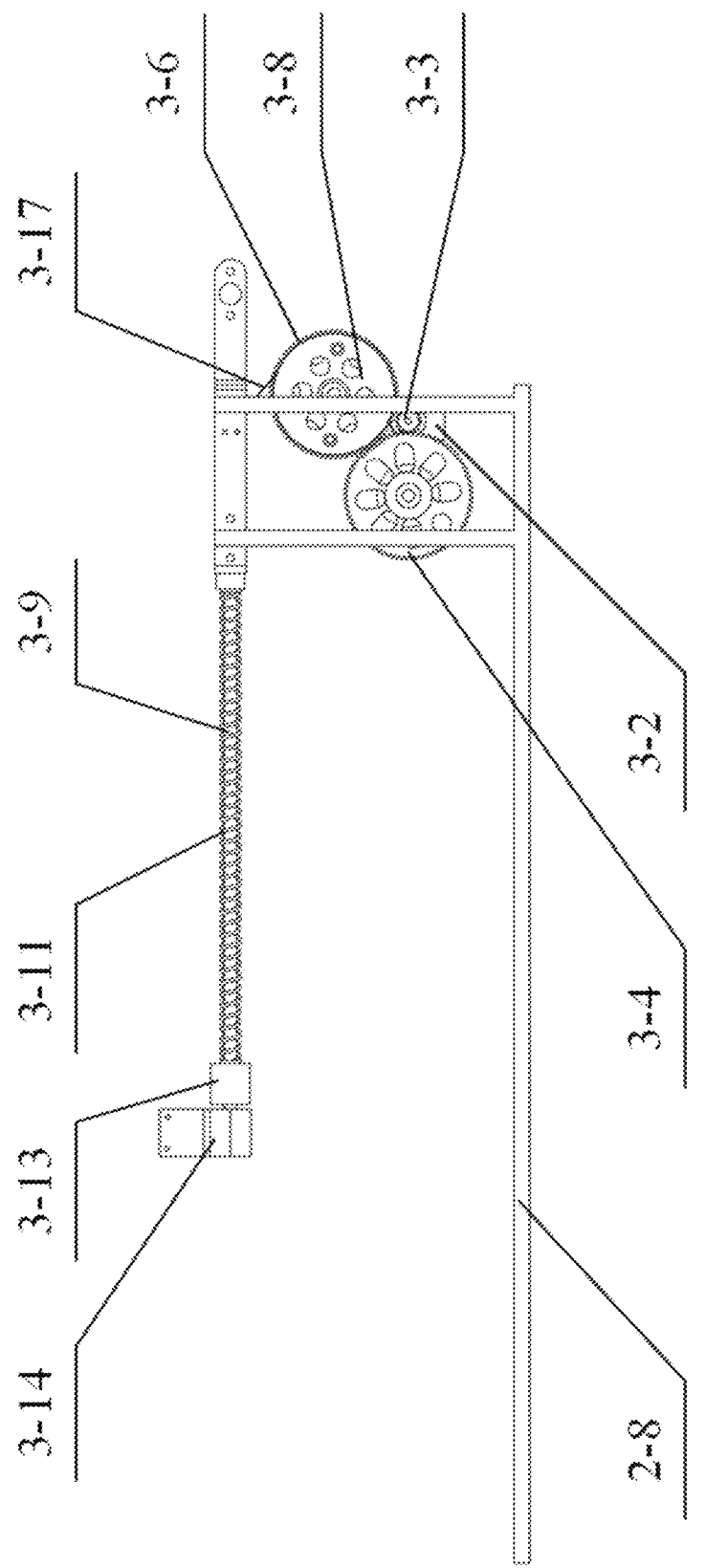
FIG. 10 is a side view 1 of the catapult mechanism of the present invention.
Figure 11:
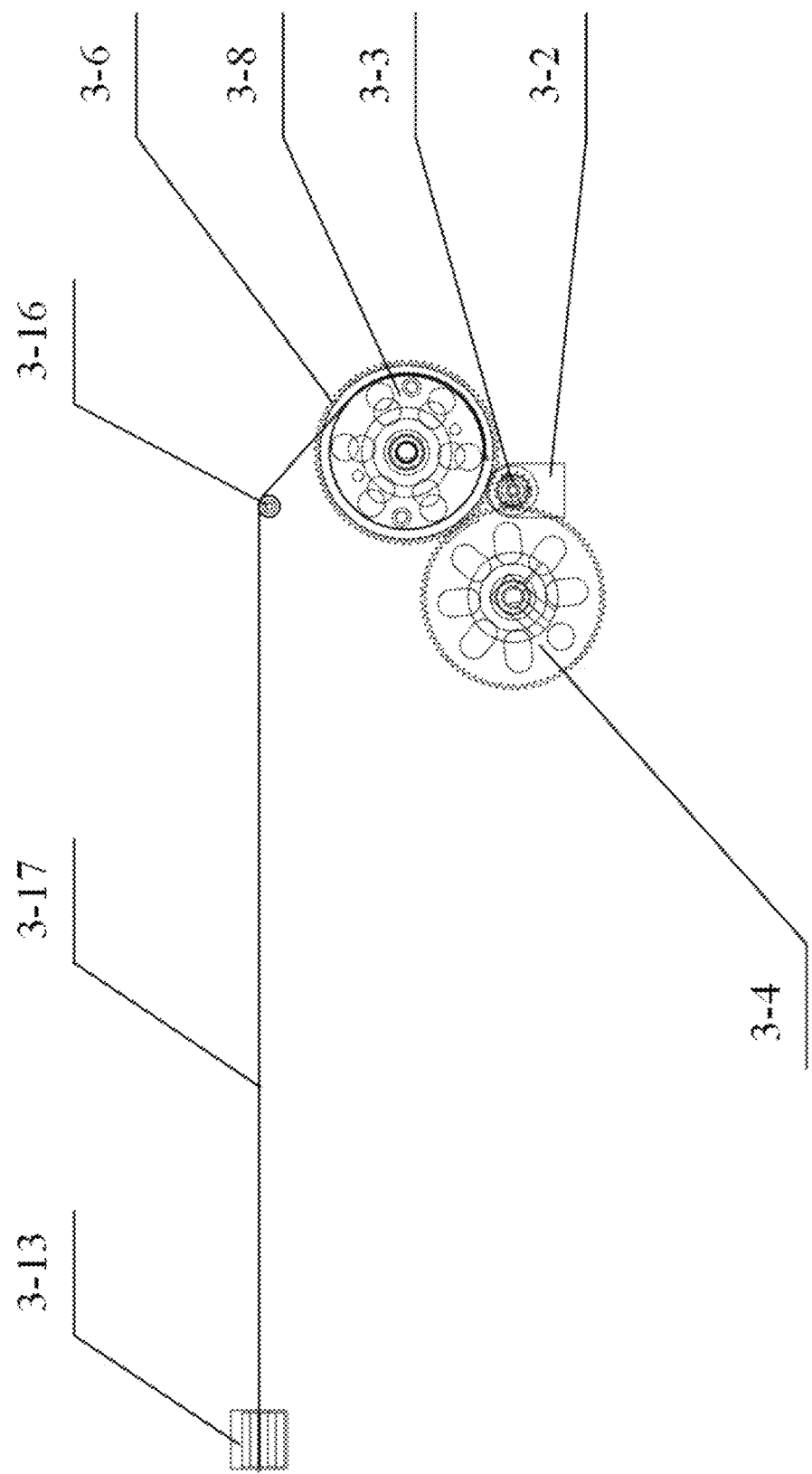
FIG. 11 is a side view 2 of the catapult mechanism of the present invention.

DESCRIPTION OF REFERENCE NUMERALS 1 denotes a base; 1-1-1 denotes a right foot pad; 1-1-2 denotes a left foot pad; 1-1-3 denotes a rear foot pad; 1-2-1 denotes a right foot tube; 1-2-2 denotes a left foot tube; 1-2-3 denotes a rear foot tube; 1-3 denotes a foot tube restraint; 1-4 denotes a middle shaft adapter; 1-5 denotes a middle shaft locking knob; 1-6 denotes a middle shaft; 1-7 denotes a pitch adjusting handle; 1-8 denotes a connector locking knob; 2 denotes an attitude adjusting mechanism; 2-1 denotes a connector; 2-2 denotes a counterweight; 2-3 denotes a base root; 2-4 denotes an attitude adjusting motor; 2-5 denotes an attitude adjusting input gear; 2-6 denotes an attitude adjusting output gear; 2-7 denotes an attitude adjusting output gear shaft; 2-8 denotes an installation platform; 3 denotes a catapult mechanism; 3-1 denotes a catapult motor frame; 3-2 denotes a catapult motor; 3-3 denotes a catapult input gear; 3-4 denotes a toothless gear; 3-5 denotes a toothless gear shaft; 3-6 denotes a winch gear; 3-7 denotes a winch gear shaft; 3-8 denotes a winch; 3-9 denotes a left slide bar; 3-10 denotes a right slide bar; 3-11 denotes a left compression spring; 3-12 denotes a right compression spring; 3-13 denotes a pull rope fixing slide block; 3-14 denotes a flapping-wing aircraft fixing part; 3-15 denotes a pulley shaft; 3-16 denotes a pulley; 3-17 denotes a pull rope; 4 denotes a recycling mechanism; 4-1 denotes a recycling motor; 4-2 denotes a recycling gear transmission mechanism; 4-2-1 denotes a recycling input gear; 4-2-2 denotes a primary transmission gear shaft; 4-2-3 denotes a secondary transmission gear shaft; 4-2-4 denotes a recycling output gear shaft I; 4-2-5 denotes a recycling output gear shaft II; 4-2-6 denotes a primary transmission gear; 4-2-7 denotes a secondary transmission gear; 4-2-8 denotes a recycling output gear I; 4-2-9 denotes a recycling output gear II; 4-3 denotes highly elastic cloth; 4-4 denotes a recycling platform frame; 4-5 denotes a sprocket I; 4-6 denotes a sprocket II; 4-7 denotes a recycling mechanical arm; 4-7-1 denotes a joint motor I; 4-7-2 denotes a big arm; 4-7-3 denotes a joint motor II; 4-7-4 denotes a middle arm; 4-7-5 denotes a joint motor III; 4-7-6 denotes a small arm; 4-7-7 denotes a rotating motor; 4-7-8 denotes a gripper motor; 4-7-9 denotes a gripper; 5 denotes a control processing unit; 6 denotes a sensor unit; 6-1 denotes an encoder; 6-2 denotes an inclination sensor; 6-3 denotes a vision sensor; and 7 denotes a power supply module.

DETAILED DESCRIPTION OF THE EMBODIMENTS

The present invention is further described with reference to the accompanying drawings and the specific implementations.

Embodiment: Referring to FIG. 1, an autonomous catapult-assisted take-off, recycling and reuse device of a flapping-wing unmanned aerial vehicle (UAV) includes a base 1, an attitude adjusting mechanism 2, a catapult mechanism 3, a recycling mechanism 4, a control processing unit 5, a sensor unit 6 and a power supply module 7. The base 1 is configured to install, fix and support the mechanisms, the units and the module. The attitude adjusting mechanism 2 realizes an attitude adjusting function of the device. The catapult mechanism 3 realizes a catapult-assisted take-off function of the flapping-wing UAV. The recycling mechanism 4 realizes landing recycling, position adjustment, and take-off reloading functions of the flapping-wing UAV. The control processing unit 5 realizes control of the attitude adjusting mechanism 2, the catapult mechanism 3, and the recycling mechanism 4, as well as processing and storage of sensor data of the sensor unit 6. The sensor unit 6 realizes detection of the rotation angle information of the motor, attitude detection of the device, and position and attitude detection of the flapping-wing UAV. The power supply module 7 supplies power to the mechanisms, the units, and the module of the device.

Referring to FIG. 1, FIG. 2, FIG. 3 and FIG. 4, the base 1 includes a right foot pad 1-1-1, a right foot tube 1-2-1, a left foot pad 1-1-2, a left foot tube 1-2-2, a rear foot pad 1-1-3, a rear foot tube 1-2-3, a foot tube restraint 1-3, a middle shaft adapter 1-4, a middle shaft locking knob 1-5, a middle shaft 1-6, a pitch adjusting handle 1-7, and a connector locking knob 1-8. The right foot pad 1-1-1 is installed at the lower end of the right foot tube 1-2-1. The left foot pad 1-1-2 is installed at the lower end of the left foot tube 1-2-2. The rear foot pad 1-1-3 is installed at the lower end of the rear foot tube 1-2-3. All the foot pads are in contact with the ground to prevent the base 1 from sliding on the ground. Three outer sleeves of the foot tube restraint 1-3 are respectively hinged to the right foot tube 1-2-1, the left foot tube 1-2-2, and the rear foot tube 1-2-3. An inner sleeve of the foot tube restraint 1-3 is sleeved over the middle shaft adapter 1-4. The upper end of the middle shaft adapter 1-4 is connected to the right foot tube 1-2-1, the left foot tube 1-2-2, and the rear foot tube 1-2-3. The middle shaft 1-6 is sheathed in the middle shaft adapter 1-4, can slide up and down, and is fixed by the middle shaft locking knob 1-5. The pitch adjusting handle 1-7 is fixed to the upper end of the middle shaft 1-6. The pitch adjusting handle 1-7 fixes the connector locking knob 1-8.

Referring to FIG. 1, FIG. 2, FIG. 3, FIG. 5 and FIG. 6, the attitude adjusting mechanism 2 includes a connector 2-1, a counterweight 2-2, a base root 2-3, an attitude adjusting motor 2-4, an attitude adjusting input gear 2-5, an attitude adjusting output gear 2-6, an attitude adjusting output gear shaft 2-7, and an installation platform 2-8. The bottom of the front end of the connector 2-1 meshes with the pitch adjusting handle 1-7 and is fixed by the connector locking knob 1-8. The counterweight 2-2 is installed at the rear end of the connector 2-1. The base root 2-3 is fixed to an upper part of the connector 2-1. The attitude adjusting motor 2-4 is installed on the base root 2-3. The attitude adjusting input gear 2-5 is fixed to an output shaft of the attitude adjusting motor 2-4. The attitude adjusting output gear shaft 2-7 is installed on the base root 2-3 through a bearing connection and is parallel to the output shaft of the attitude adjusting motor 2-4. The attitude adjusting output gear 2-6 is fixedly connected to the attitude adjusting output gear shaft 2-7 and meshes with the attitude adjusting input gear 2-5. The installation platform 2-8 is sleeved over the attitude adjusting output gear shaft 2-7 and is fixed to the surface of the attitude adjusting output gear 2-6. By controlling forward and backward movement of the attitude adjusting motor 2-4, the attitude adjusting input gear 2-5, the attitude adjusting output gear 2-6, and the attitude adjusting output gear shaft 2-7 are driven to rotate in turn to realize pitch attitude adjustment of the installation platform 2-8.

Referring to FIGS. 1-3 and 7-13, the catapult mechanism 3 includes a catapult motor frame 3-1, a catapult motor 3-2, a catapult input gear 3-3, a toothless gear 3-4, a toothless gear shaft 3-5, a winch gear 3-6, a winch gear shaft 3-7, a winch 3-8, a left slide bar 3-9, a right slide bar 3-10, a left compression spring 3-11, a right compression spring 3-12, a pull rope fixing slide block 3-13, a flapping-wing aircraft fixing part 3-14, a pulley shaft 3-15, a pulley 3-16 and a pull rope 3-17. The catapult motor frame 3-1 is fixed to the installation platform 2-8. The catapult motor 3-2 is installed on the catapult motor frame 3-1. The catapult input gear 3-3 is installed on an output shaft of the catapult motor 3-2 and meshes with a toothed half of the toothless gear 3-4. The toothless gear 3-4 is fixedly connected to the toothless gear shaft 3-5. The winch gear 3-6 is fixedly connected to the winch gear shaft 3-7 and meshes with a toothless half of the toothless gear 3-4. The toothless gear shaft 3-5 and the winch gear shaft 3-7 are both connected to the catapult motor frame 3-1 through bearings and can rotate relative to the catapult motor frame 3-1. The winch 3-8 is fixed to the winch gear 3-6 and is coaxial with the same. The left slide bar 3-9 and the right slide bar 3-10 are parallel, and the rear ends of the left slide bar and the right slide bar are fixed to the installation platform 2-8. The left compression spring 3-11 is coaxially sleeved over an outer surface of the left slide bar 3-9, and a rear end of the left compression spring is fixed to the installation platform 2-8. The right compression spring 3-12 is coaxially sleeved over an outer surface of the right slide bar 3-10, and a rear end of the compression spring is fixed to the installation platform 2-8. A front end of the left compression spring 3-11 and a front end of the right compression spring 3-12 are both fixedly connected to the pull rope fixing slide block 3-13. Two bilaterally symmetrical through-holes of the flapping-wing aircraft fixing part 3-14 are respectively sleeved over the left slide bar 3-9 and the right slide bar 3-10 and are close to the pull rope fixing slide block 3-13. The pulley shaft 3-15 is fixed to the installation platform 2-8, and the pulley 3-16 is sleeved over the pulley shaft 3-15. One end of the pull rope 3-17 is fixedly connected to the pull rope fixing slide block 3-13, and the other end of the pull rope 3-17 passes through a round hole in the installation platform 2-8, goes around the pulley 3-16 and is fixed to the winch 3-8.

The working principle of the catapult mechanism is as follows:

When the catapult motor 3-2 rotates, the catapult motor can drive the catapult input gear 3-3 to rotate, the catapult input gear 3-3 further drives the toothless gear 3-4 to rotate, and the toothless gear 3-4 further drives the winch gear 3-6 to rotate, and further drives the winch 3-8 to rotate, thereby continuously winding the pull rope 3-17 on the winch 3-8. While the pull rope 3-17 is wound, the pull rope fixing slide block 3-13 is driven to slide on the left slide bar 3-9 and the right slide bar 3-10, thereby compressing the left compression spring 3-11 and the right compression spring 3-12 to store elastic potential energy. The catapult motor 3-2 stops rotating when the toothless gear 3-4 rotates for one circle to reach a part that does not mesh with the winch gear 3-6. Driven by the elastic potential energy of the left compression spring 3-11 and the right compression spring 3-12, the pull rope 3-17 wound on the winch 3-8 is quickly pulled apart, the pull rope fixing slide block 3-13 pushes the flapping-wing aircraft fixing part 3-14 to catapult at high speed, and then catapult-assisted take-off can be realized.

Referring to FIGS. 1-3 and 14-24, the recycling mechanism includes a recycling motor 4-1, a recycling gear transmission mechanism 4-2, highly elastic cloth 4-3, a recycling platform frame 4-4, a sprocket I 4-5, a sprocket II 4-6, and a recycling mechanical arm 4-7. The installation platform 2-8 is provided with a plurality of through-holes for installing the recycling motor 4-1, the recycling gear transmission mechanism 4-2, and the recycling mechanical arm 4-7. The recycling platform frame 4-4 is a highly elastic steel sheet and is provided with square through-holes every the same distance for meshing with the sprocket I 4-5 and the sprocket II 4-6. A bottom side of the installation platform 2-8 is provided with two bilaterally symmetrical d-shaped slots, and outer surfaces of the front ends of the slots are both provided with boss stoppers. An edge of the highly elastic cloth 4-3 wraps the recycling platform frame 4-4, and both ends of the highly elastic cloth are provided with round through-holes for being sleeved over the boss stoppers on the outer surfaces of the front ends of the d-shaped slots of the installation platform 2-8, thereby guaranteeing that the highly elastic cloth 4-3 will not be recycled with the recycling platform frame 4-4. Two ends of the recycling platform frame 4-4 are fixed with two left and right columns respectively through the two d-shaped slots of the installation platform 2-8. A cuboid notch is formed in the middle of each of the two d-shaped slots and is used for the sprocket I 4-5 and the sprocket II 4-6 to mesh with the recycling platform frame 4-4.

Figure 15:
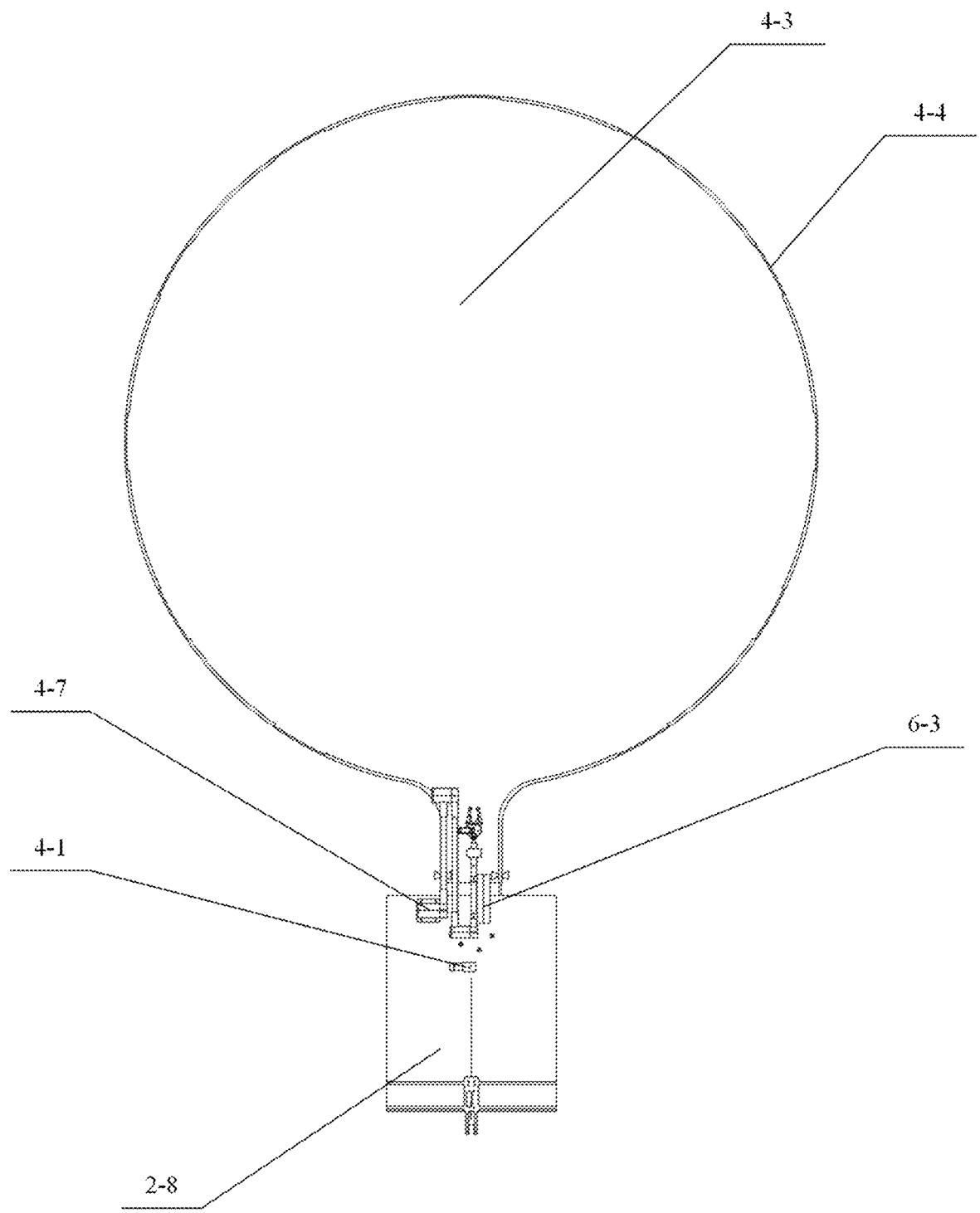
FIG. 15 is a top view of the recycling mechanism of the present invention.
Figure 16:
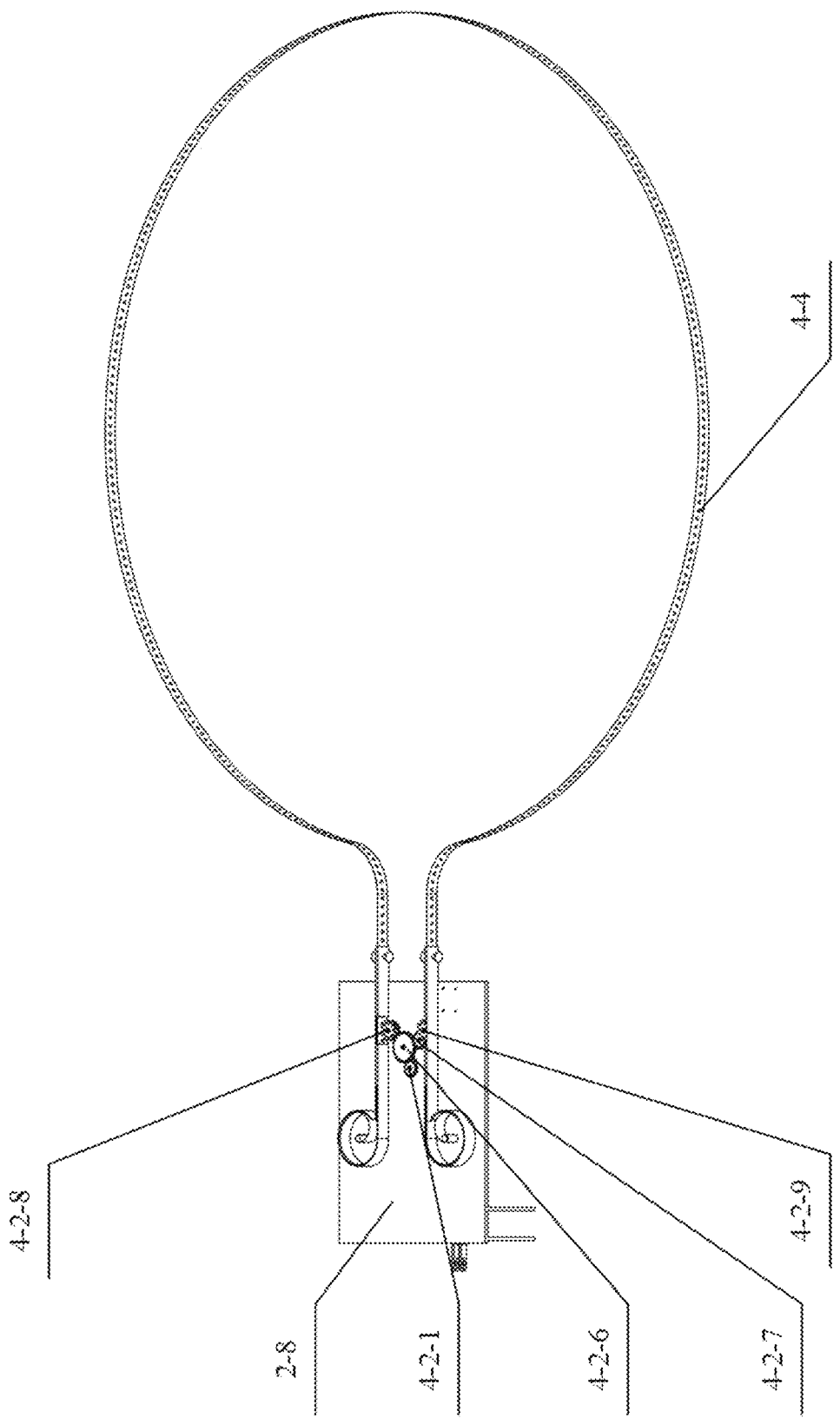
FIG. 16 is a schematic diagram 1 of components of a drive system of the recycling mechanism of the present invention.

Referring to FIGS. 15 and 16, the recycling gear transmission mechanism includes a recycling input gear 4-2-1, a primary transmission gear shaft 4-2-2, a secondary transmission gear shaft 4-2-3, a recycling output gear shaft I 4-2-4, a recycling output gear shaft II 4-2-5, a primary transmission gear 4-2-6, a secondary transmission gear 4-2-7, a recycling output gear I 4-2-8 and a recycling output gear II 4-2-9. The recycling input gear 4-2-1 is installed on an output shaft of the recycling motor 4-1. The primary transmission gear shaft 4-2-2, the secondary transmission gear shaft 4-2-3, the recycling output gear shaft I 4-2-4, and the recycling output gear shaft II 4-2-5 are fixed to the installation platform 2-8 and are parallel to each other. The primary transmission gear 4-2-6 is installed on the primary transmission gear shaft 4-2-2 and meshes with the recycling input gear 4-2-1. The secondary transmission gear 4-2-7 is installed on the secondary transmission gear shaft 4-2-3 and meshes with the primary transmission gear 4-2-6. The recycling output gear I 4-2-8 and the recycling output gear II 4-2-9 are respectively sleeved over the recycling output gear shaft I 4-2-4 and the recycling output gear shaft II 4-2-5, and respectively mesh with the primary transmission gear 4-2-6 and the secondary transmission gear 4-2-7. The sprocket I 4-5 and the sprocket II 4-6 are sleeved over the recycling output gear shaft I 4-2-4 and the recycling output gear shaft II 4-2-5. The recycling output gear I 4-2-8 is fixed to the sprocket I 4-5, and the recycling output gear II 4-2-9 is fixed to the sprocket II 4-6.

Referring to FIGS. 1-3 and 17-20, the recycling mechanical arm 4-7 includes a joint motor I 4-7-1, a big arm 4-7-2, a joint motor II 4-7-3, a middle arm 4-7-4, a joint motor III 4-7-5, a small arm 4-7-6, a rotating motor 4-7-7, a gripper motor 4-7-8 and a gripper 4-7-9. The joint motor I 4-7-1 is fixed at a corresponding position of the installation platform 2-8 through four round holes of a base of the joint motor I. One end of the big arm 4-7-2 is fixed to an output shaft of the joint motor I 4-7-1, and the other end of the big arm is installed in a sleeve arranged in a shell of the joint motor II 4-7-3. One end of the middle arm 4-7-4 is fixed to an output shaft of the joint motor II 4-7-3, and the other end of the middle arm is installed in a sleeve arranged in a shell of the joint motor III 4-7-5. One end of the small arm 4-7-6 is fixed to an output shaft of the joint motor III 4-7-5, and the other end of the small arm is fixed coaxially to the rotating motor 4-7-7. The gripper motor 4-7-8 is installed on one side of the gripper 4-7-9, and a bottom end of the gripper 4-7-9 is installed on an output shaft of the rotating motor 4-7-7.

The working principle of the recycling mechanism is as follows:

When the recycling motor 4-1 rotates, the recycling motor may drive the recycling input gear 4-2-1 to rotate. The recycling input gear 4-2-1 further drives the primary transmission gear 4-2-6 to rotate. The primary transmission gear 4-2-6 further drives the secondary transmission gear 4-2-7. The primary transmission gear 4-2-6 and the secondary transmission gear 4-2-7 respectively drive the recycling output gear I 4-2-8 and the recycling output gear II 4-2-9 to rotate. The recycling output gear I 4-2-8 drives the sprocket I 4-5 to rotate coaxially. The recycling output gear II 4-2-9 drives the sprocket II 4-6 to rotate coaxially. Thus, the recycling platform frame 4-4 is continuously contracted into the d-shaped slots of the installation platform 2-8. The highly elastic cloth 4-3 is blocked by the boss stoppers on the outer surfaces of the front ends of the d-shaped slots of the installation platform 2-8 and will not be recycled. The flapping-wing UAV slides down to the center of the highly elastic cloth 4-3 due to gravity. The vision sensor 6-3 captures the position of the flapping-wing UAV. The joint motor I 4-7-1, the joint motor II 4-7-3, the joint motor III 4-7-5, and the rotating motor 4-7-7 of the recycling mechanical arm 4-7 work at the same time. The recycling mechanical arm 4-7 unfolds and rotates the gripper 4-7-9 to adapt to an angle of the flapping-wing UAV. The gripper motor 4-7-8 works and the gripper 4-7-9 grabs the frame of the flapping-wing UAV on a grabbing plane and rotates the frame. When the plane of the frame of the flapping-wing UAV coincides with a grabbing plane of the recycling mechanical arm 4-7, the gripper 4-7-9 grabs a grabbing ring on an upper part of the frame of the flapping-wing UAV and re-sleeves the flapping-wing aircraft fixing part 3-14 over the left slide bar 3-9 and the right slide bar 3-10 of the catapult mechanism to realize recycling and take-off reloading.

Referring to FIGS. 1-4, 13-14, and 17-24, the sensor unit 6 includes an encoder 6-1, an inclination sensor 6-2, and a vision sensor 6-3. The encoder 6-1 is installed at the end of the recycling motor 4-1 and transmits an operating status of the recycling motor 4-1 to a motor controller in real-time to realize speed regulation and start-stop of the recycling motor 4-1. The inclination sensor 6-2 is fixed to an upper surface of the base root 2-3 of the attitude adjusting mechanism 2 to collect an inclination angle of the installation platform 2-8 during attitude adjustment. The vision sensor 6-3 is fixed to the small arm of the recycling mechanical arm 4-7 and is configured to detect real-time position and attitude information of the flapping-wing UAV.

Referring to FIG. 1, the power supply module 7 provides energy for the attitude adjusting mechanism 2, the catapult mechanism 3, the recycling mechanism 4, the control processing unit 5, and the sensor unit 6.

Figure 12:
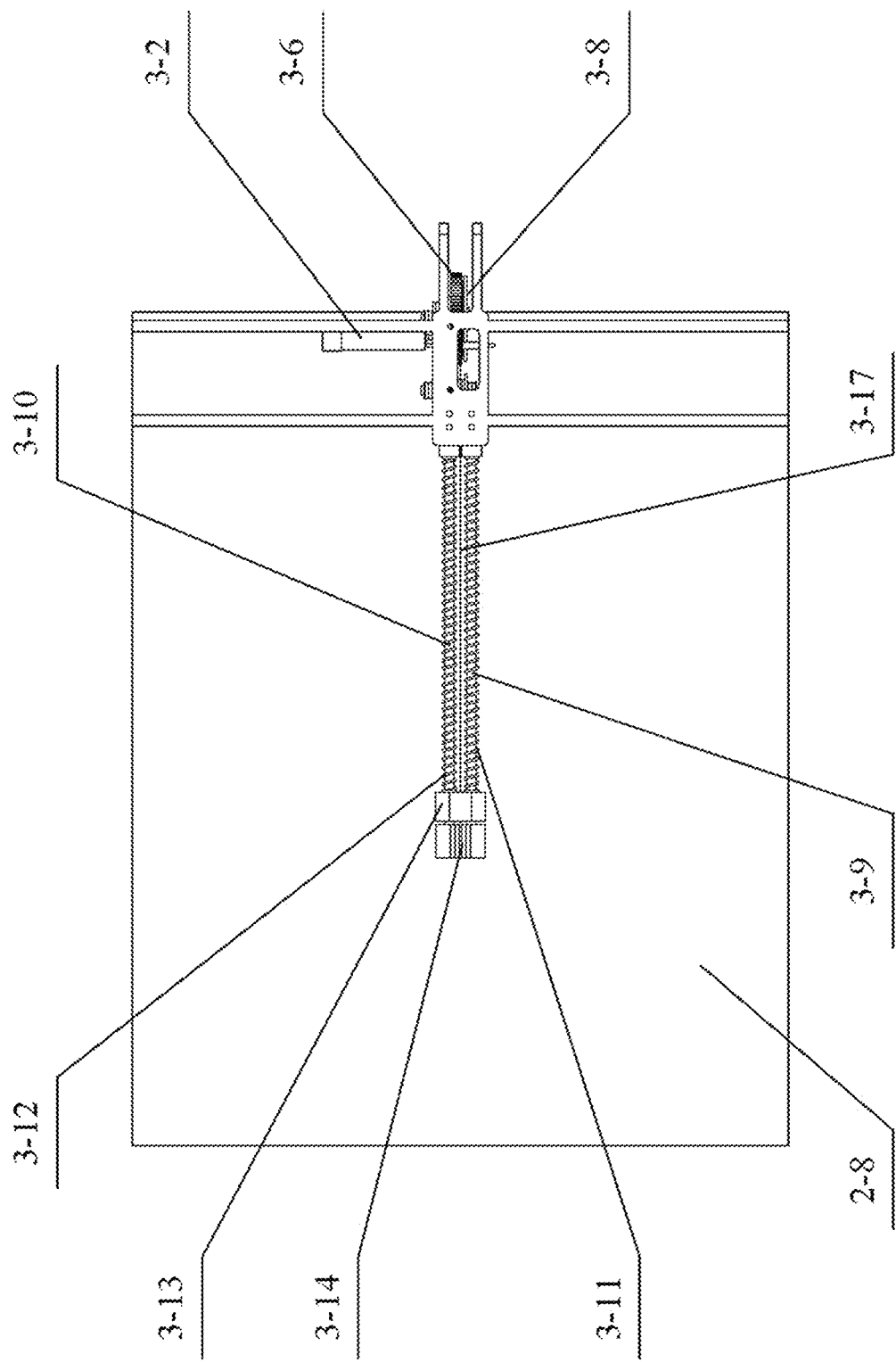
FIG. 12 is a top view of the catapult mechanism of the present invention.
Figure 13:
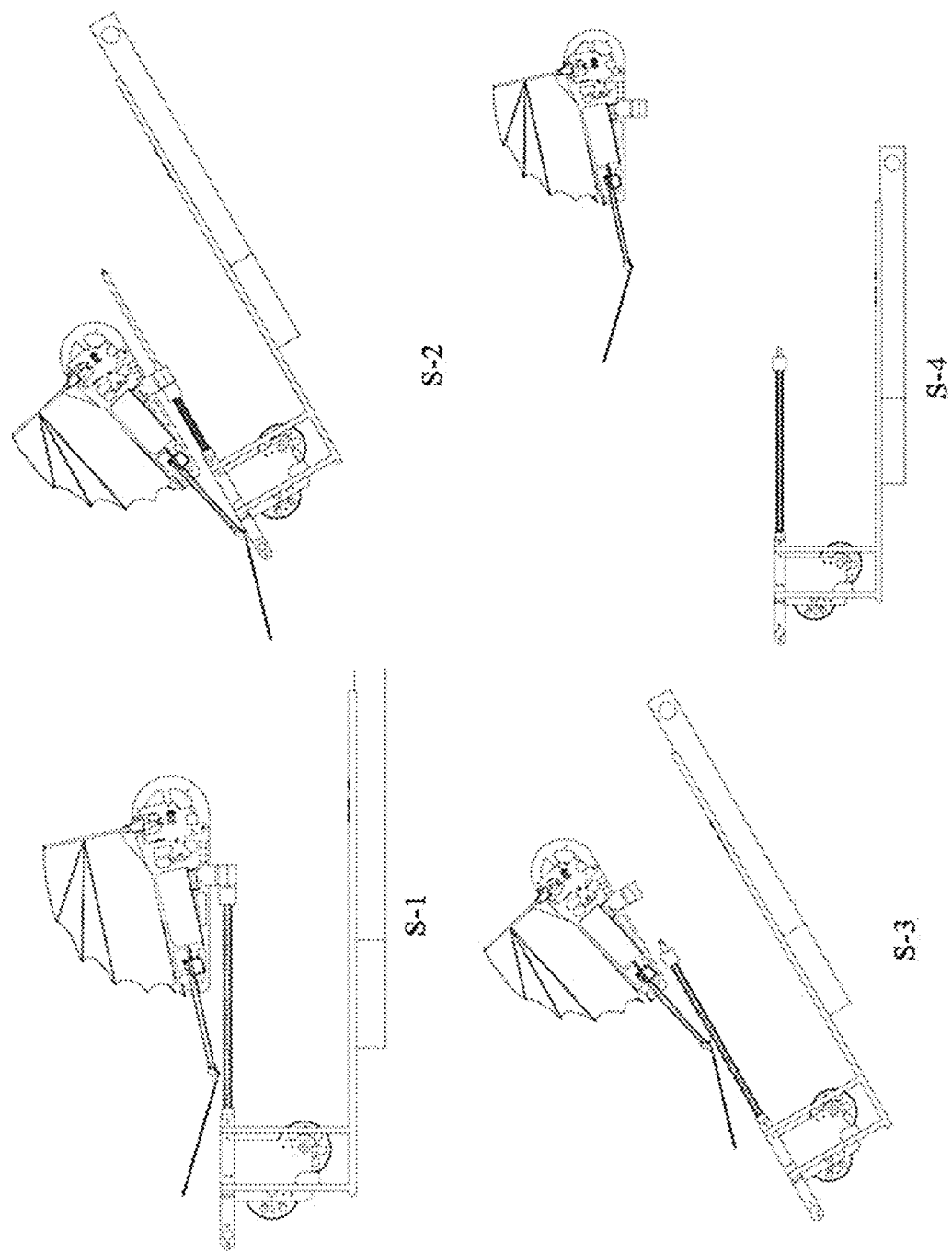
FIG. 13 is a sequence diagram of a catapult process of the catapult mechanism of the present invention.
Figure 14:
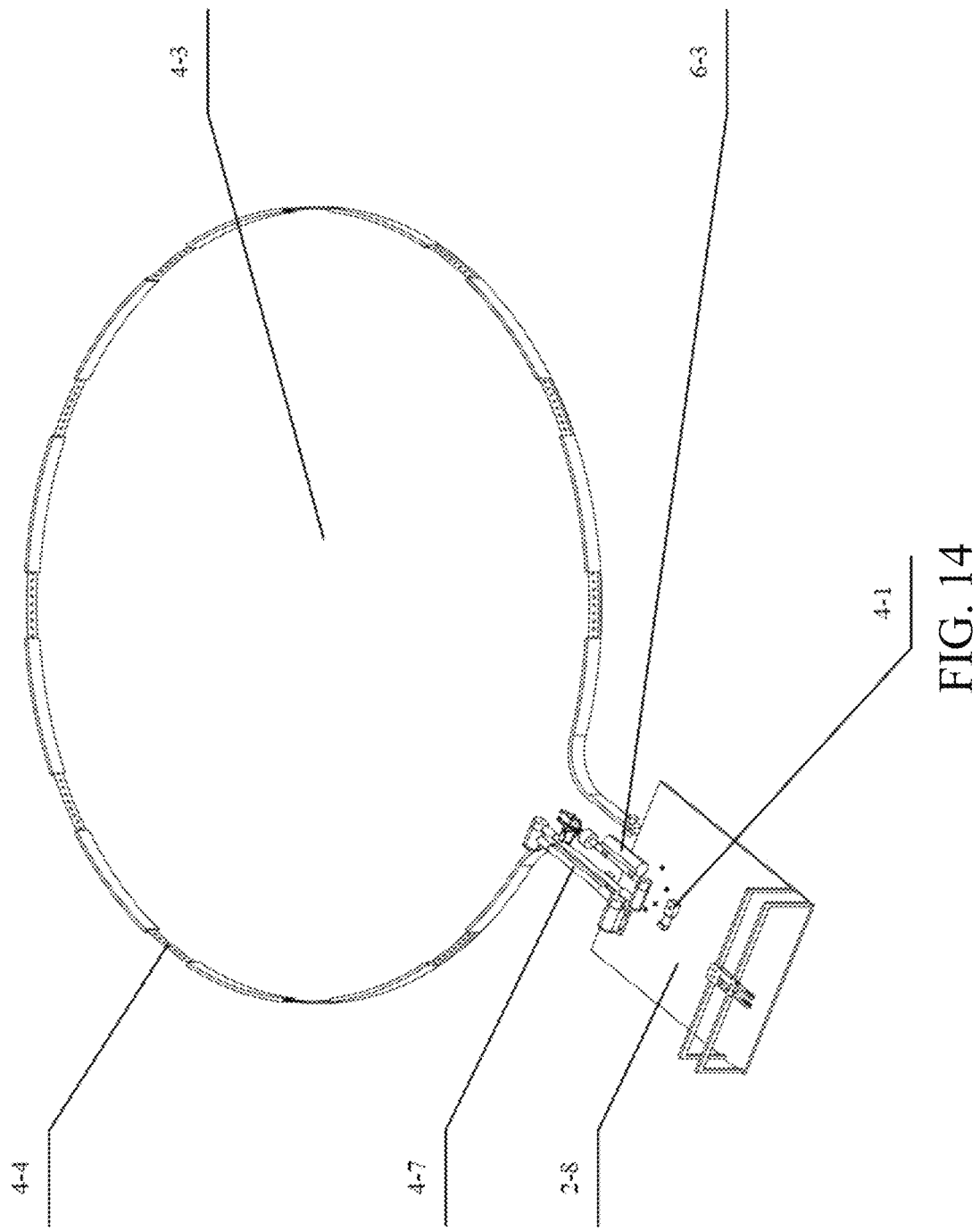
FIG. 14 is a perspective view of the recycling mechanism of the present invention.

Referring to FIG. 12, the steps of catapult-assisted take-off of the device are as follows:

S1: The flapping-wing UAV is fixed to the flapping-wing aircraft fixing part 3-14. The two left and right through-holes of the flapping-wing aircraft fixing part 3-14 are sleeved over the left slide bar 3-9 and the right slide bar 3-10 of the catapult mechanism 2.

S2: The attitude adjusting mechanism 2 and the catapult mechanism 3 work together. While the catapult angle of the flapping-wing UAV is adjusted to an angle suitable for catapult-assisted take-off, the left compression spring 3-11 and the right compression spring 3-12 have a certain amount of compression.

S3: The flapping-wing UAV completes catapult-assisted take-off.

S4: The attitude adjusting mechanism 2 works, and the installation platform 2-8 returns to the horizontal angle and gets ready for the next catapult assisted take-off.

Figure 17:
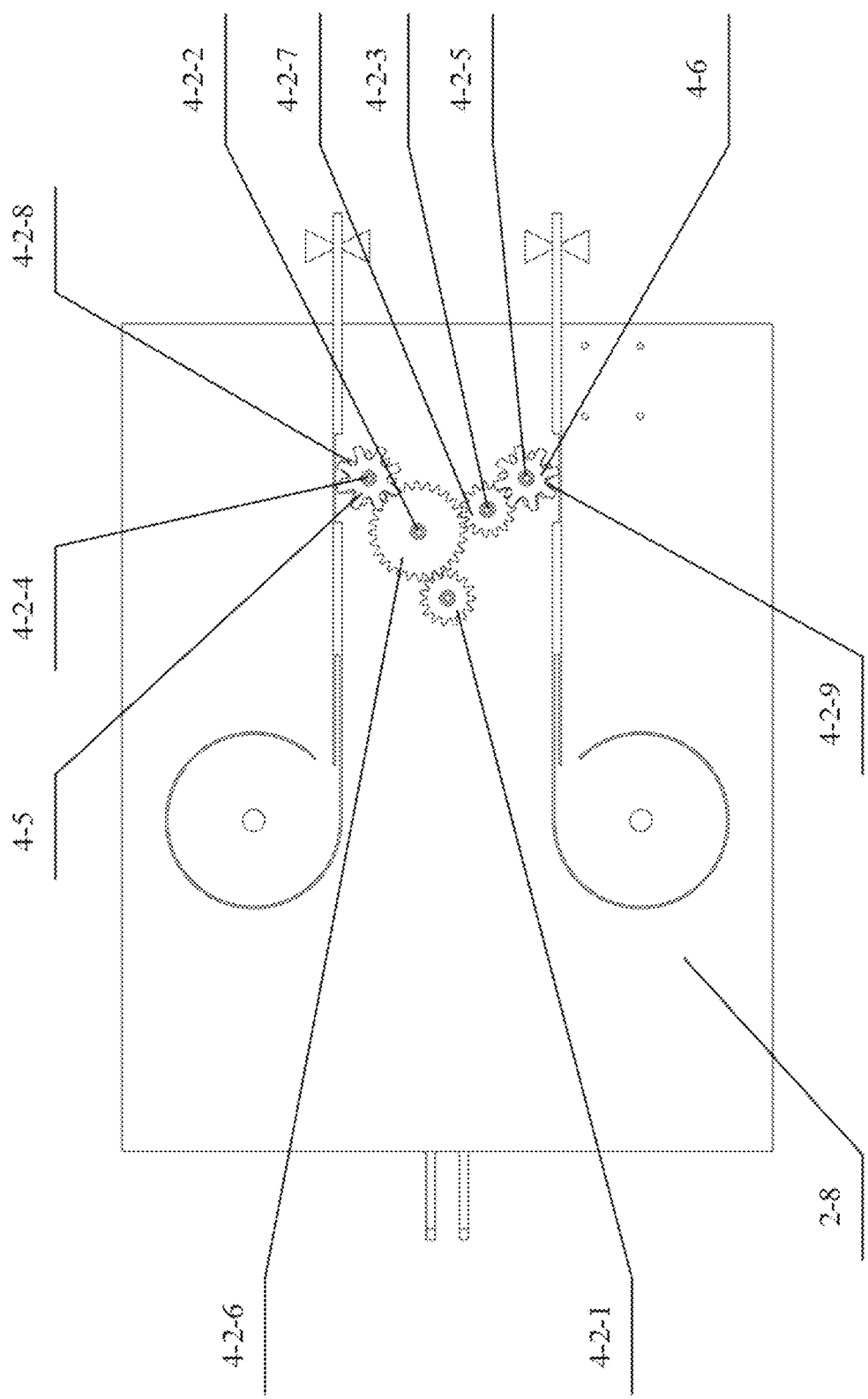
FIG. 17 is a schematic diagram 2 of the components of the drive system of the recycling mechanism of the present invention.
Figure 18:
FIG. 18 is a motion sequence diagram of the recycling process of the present invention.
Figure 18:
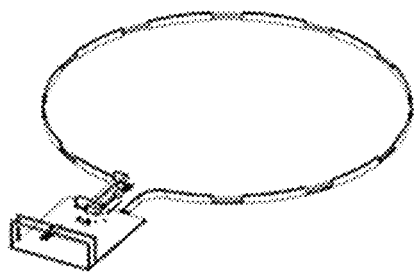
Figure 18:
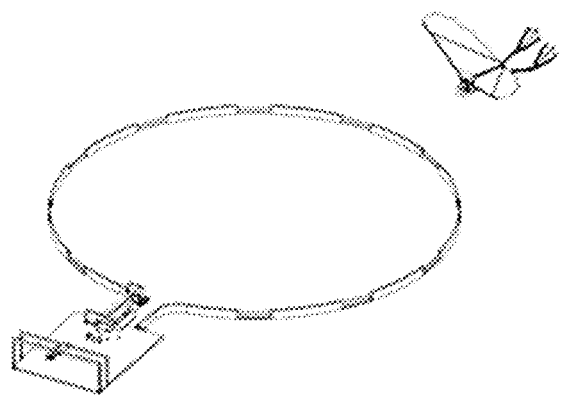
Figure 18:
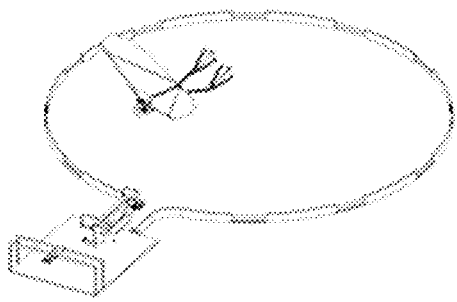
Figure 18:
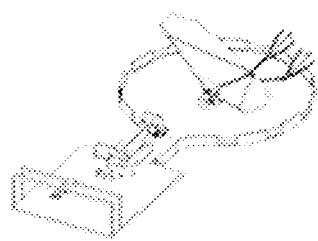

Referring to FIG. 17, the recycling steps of the device are as follows:

S5: The flapping-wing UAV flies from a distance.

S6: The attitude adjusting mechanism 2 works and the installation platform 2-8 is adjusted to an angle suitable for recycling the flapping-wing UAV and gets ready for recycling.

S7: The flapping-wing UAV is dropped on the highly elastic cloth 4-3, and the installation platform 2-8 is adjusted to the horizontal position at the same time.

S8: The recycling motor 4-1 works, the recycling platform shrinks, and the flapping-wing UAV falls to the center of the highly elastic cloth 4-3.

Figure 19:
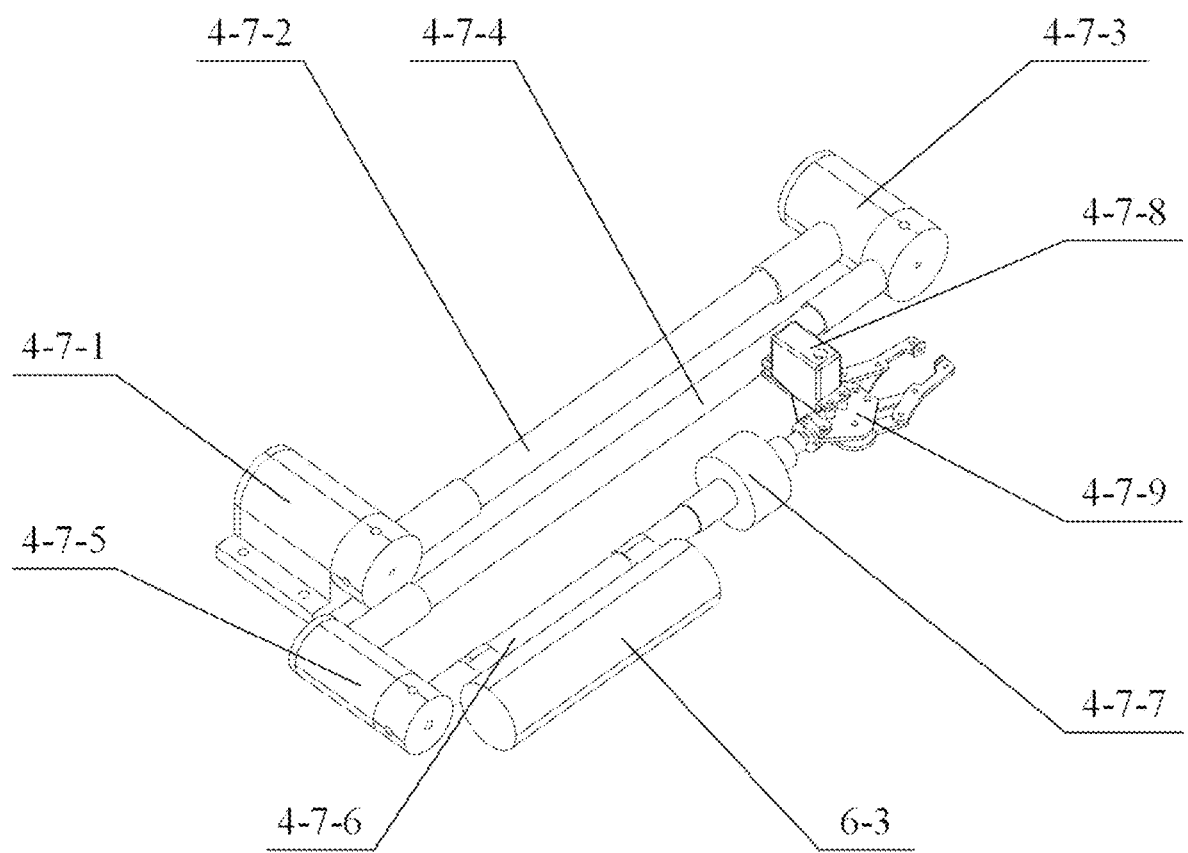
FIG. 19 is a perspective view of a mechanical arm of the recycling mechanism of the present invention.
Figure 20:
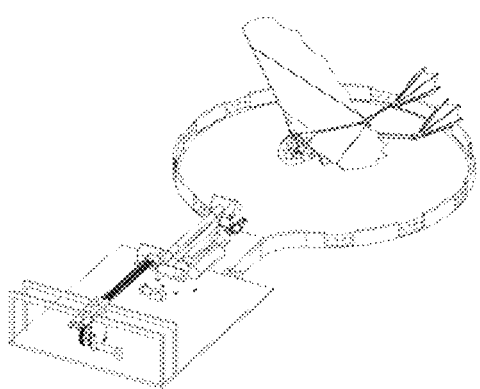
FIG. 20 is a sequence diagram of multiple times of coordination of the mechanical arm of the recycling mechanism of the present invention.
Figure 20:
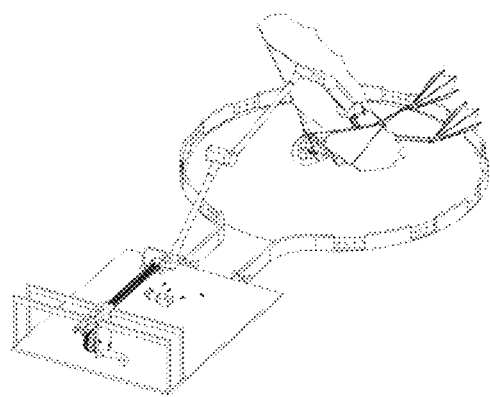
Figure 20:
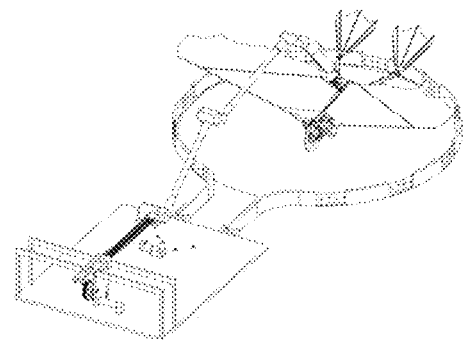
Figure 20:
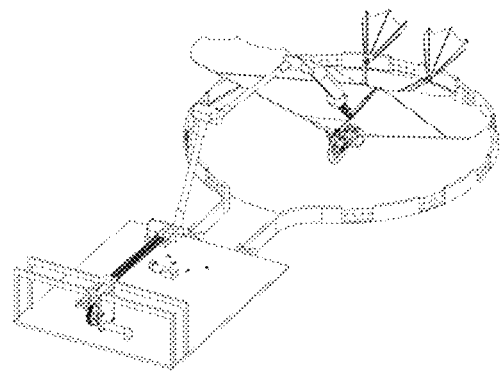
Figure 21:
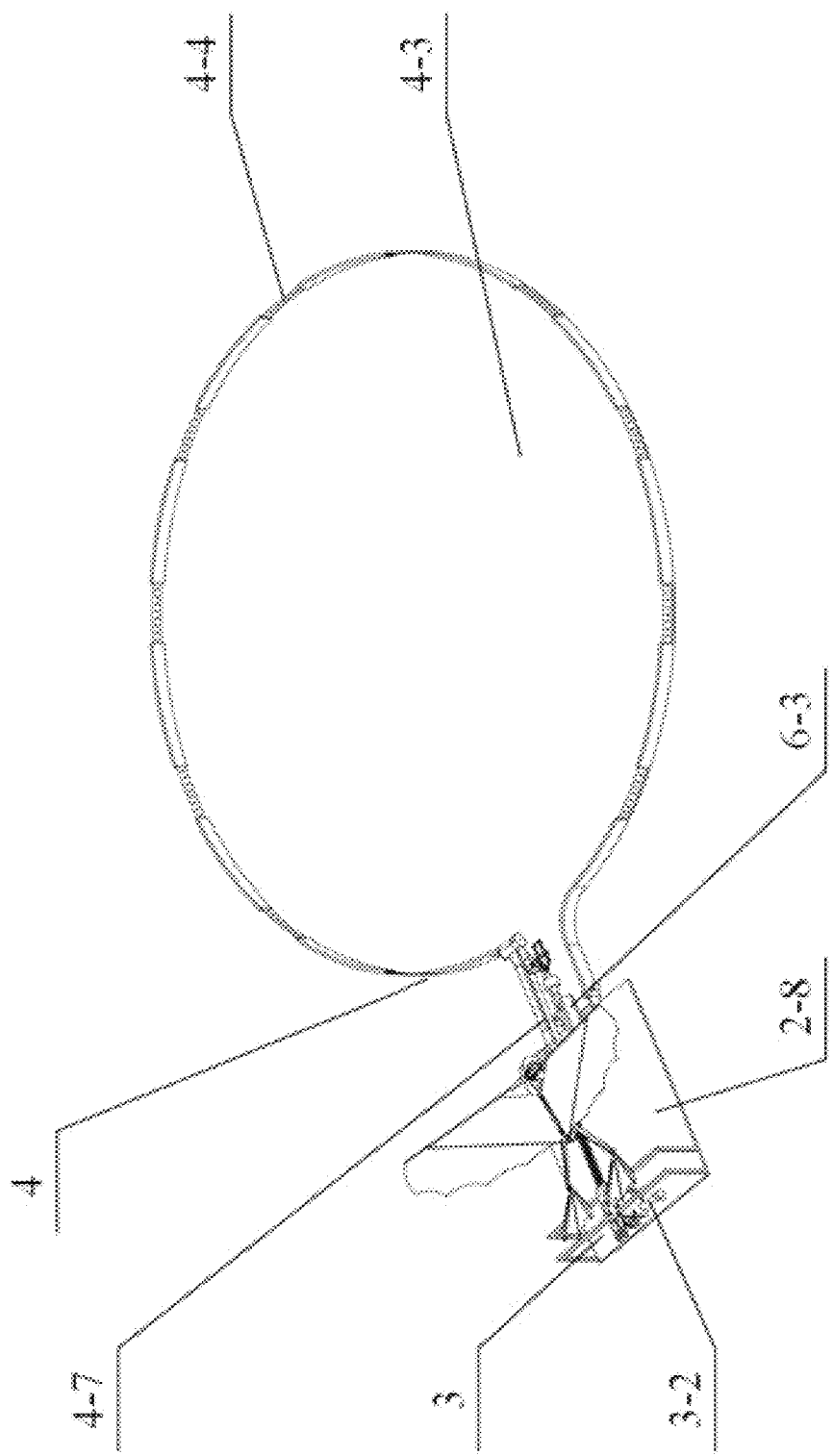
FIG. 21 is a perspective view of a take-off reloading mechanism of the present invention.

Referring to FIG. 19, the steps of multiple times of coordination of the recycling mechanical arm of the device are as follows:

S9: The flapping-wing UAV is recycled.

S10: The recycling mechanical arm 4-7 rotates the gripper 4-7-9 to adapt to the angle of the frame of the flapping-wing UAV and at the same time grabs the frame part of the flapping-wing UAV on a grabbing plane.

S11: The recycling mechanical arm 4-7 rotates the gripper 4-7-9 to make the plane of the frame of the flapping-wing UAV coincide with a grabbing plane of the recycling mechanical arm 4-7.

S12: The gripper 4-7-9 of the recycling mechanical arm 4-7 grabs the grabbing ring on the upper part of the frame of the flapping-wing UAV.

Figure 22:
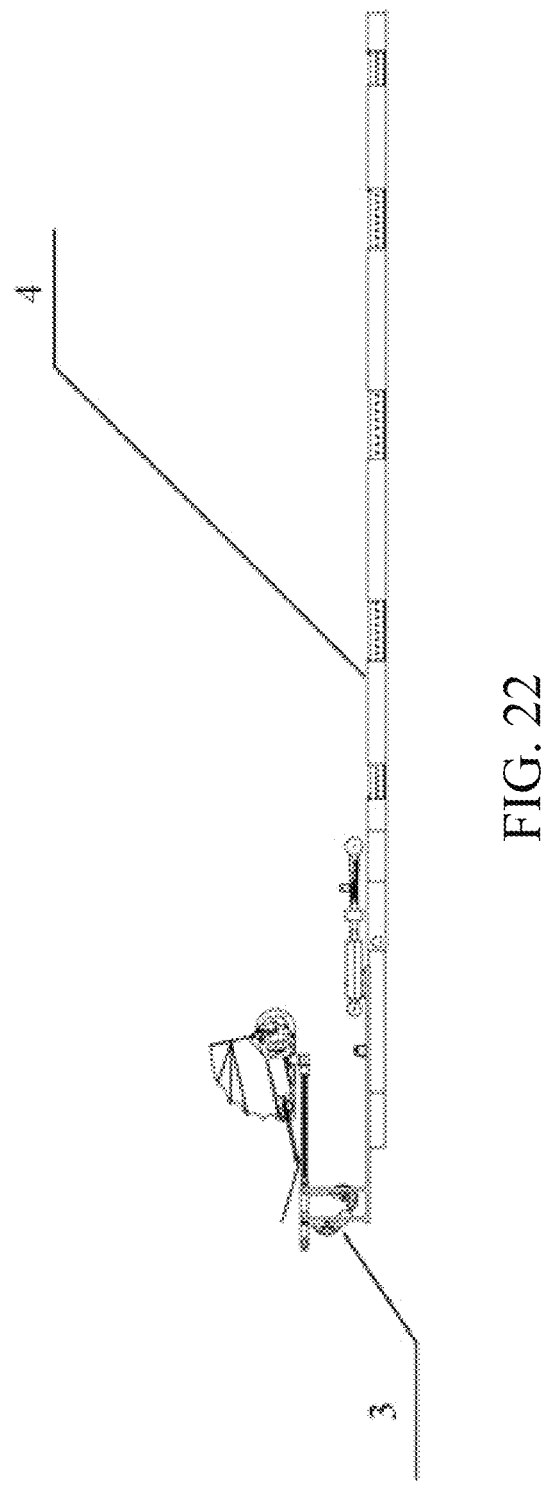
FIG. 22 is a front view of the take-off reloading mechanism of the present invention.
Figure 23:
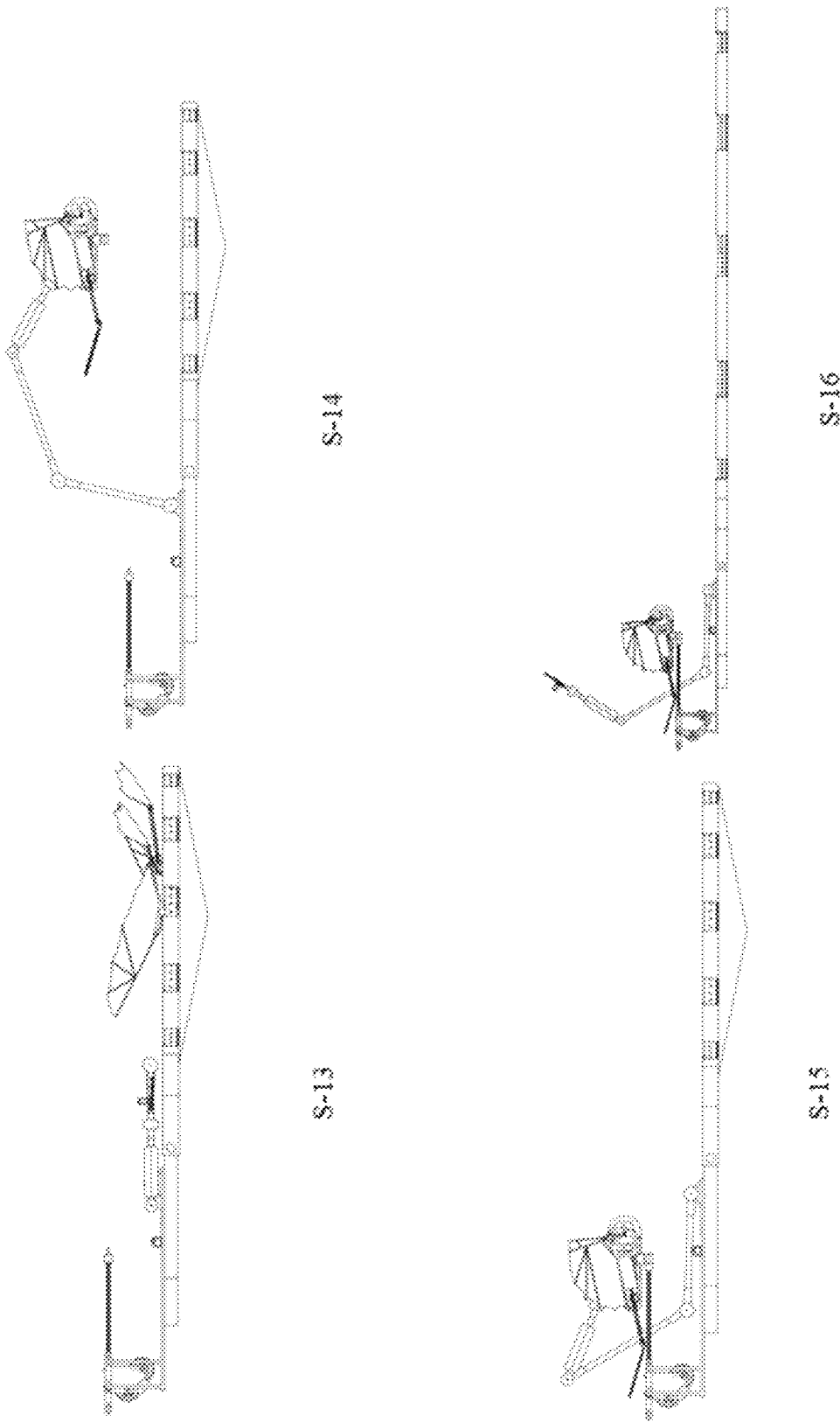
FIG. 23 is sequence diagram 1 of a take-off reloading process of the present invention.
Figure 24:
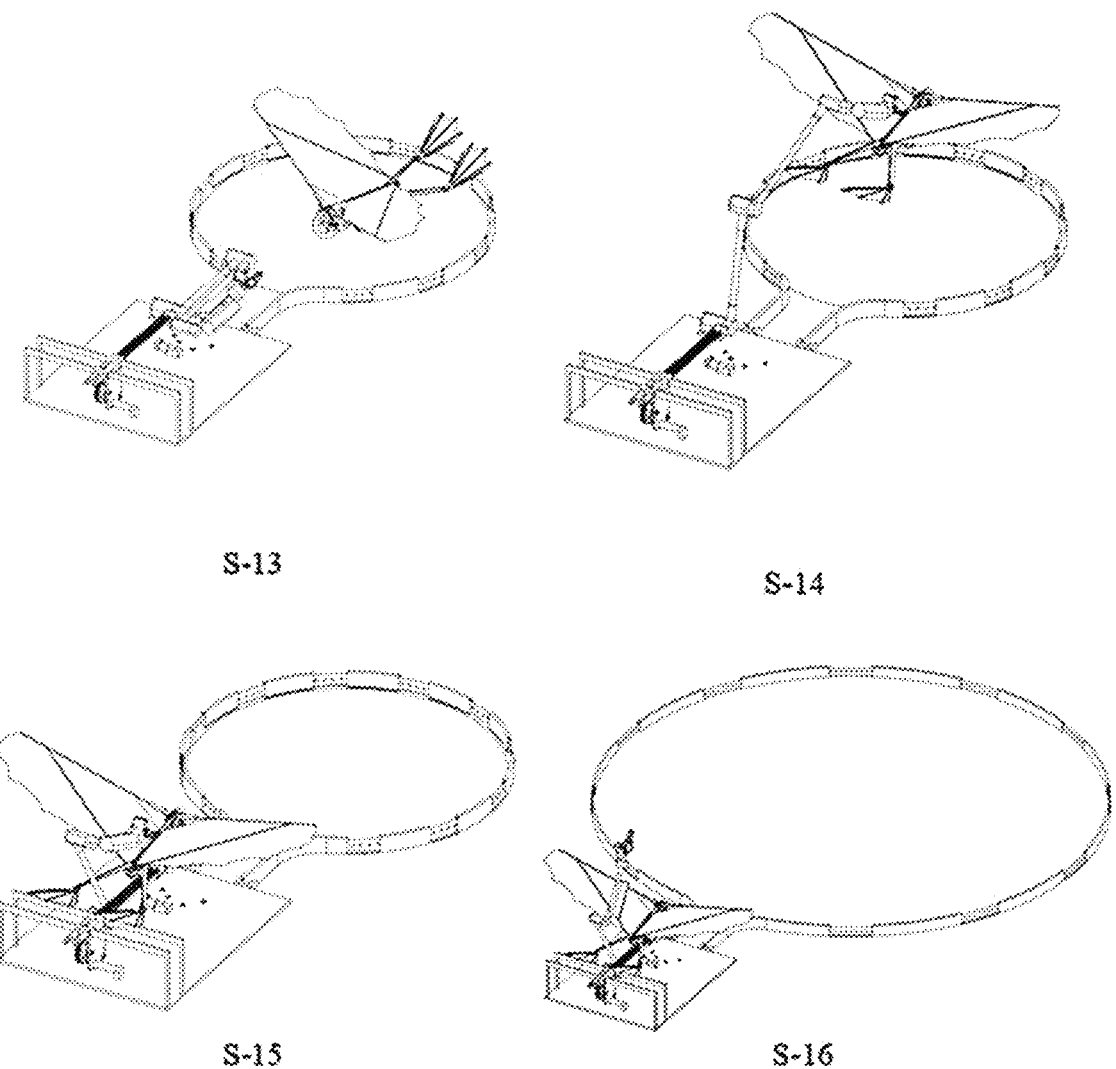
FIG. 24 is sequence diagram 2 of the take-off reloading process of the present invention.

Referring to FIG. 22 and FIG. 23, the take-off reloading steps of the device are as follows:

S13: The flapping-wing UAV is located in the center of the highly elastic cloth, and the recycling mechanical arm 4-7 is ready to grab the UAV.

S14: The recycling mechanical arm 4-7 coordinates the flapping-wing UAV many times and picks up the UAV through the grabbing ring of the UAV.

S15: The recycling mechanical arm 4-7 grabs the flapping-wing UAV and re-sleeves the flapping-wing aircraft fixing part 3-14 over the left slide bar 3-9 and the right slide bar 3-10 of the catapult mechanism 3.

S16: The take-off reloading is completed, and the recycling mechanism 4 restores and gets ready for the next recycling work.

The foregoing descriptions are merely preferred embodiments of the present invention and are not intended to limit the present invention in other manners. Any modification and equivalent change according to the technical essence of the present invention shall fall within the scope of the technical solutions of the present invention.

What is claimed is:

1. An autonomous catapult-assisted take-off, recycling, and reuse device for a flapping-wing unmanned aerial vehicle (UAV), comprising a base, an attitude adjusting mechanism, a catapult mechanism, a recycling mechanism, a control processing unit, a sensor unit, and a power supply module, wherein the attitude adjusting mechanism is installed on a top of the base; the catapult mechanism and the recycling mechanism are installed on an upper part of the attitude adjusting mechanism; the attitude adjusting mechanism, the catapult mechanism, and the recycling mechanism are all connected to the control processing unit; and the attitude adjusting mechanism, the catapult mechanism, the recycling mechanism, the control processing unit and the sensor unit are all connected to the power supply module;

the catapult mechanism comprises a catapult motor frame, a catapult motor, a catapult input gear, a toothless gear, a toothless gear shaft, a winch gear, a winch gear shaft, a winch, a left slide bar, a right slide bar, a left compression spring, a right compression spring, a pull rope fixing slide block, a flapping-wing aircraft fixing part, a pulley shaft, a pulley, and a pull rope;

the catapult motor frame is fixed to a top of an installation platform, and the catapult motor is fixedly connected to the catapult motor frame; the catapult input gear is installed on an output shaft of the catapult motor, and meshes with a toothed half of the toothless gear; the toothless gear is fixedly connected to the toothless gear shaft; the winch gear is fixedly connected to the winch gear shaft and meshes with a toothless half of the toothless gear; the toothless gear shaft and the winch gear shaft are both connected to the catapult motor frame through bearings, and are configured to rotate relative to the catapult motor frame; the winch is fixed to the winch gear and is coaxial with the winch gear; the left slide bar and the right slide bar are parallel, and rear ends of the left slide bar and the right slide bar are both fixed to the installation platform; the left compression spring is coaxially sleeved over an outer surface of the left slide bar, and a rear end of the left compression spring is fixed to the installation platform; the right compression spring is coaxially sleeved over an outer surface of the right slide bar, and a rear end of the right compression spring is fixed to the installation platform; a front end of the left compression spring and a front end of the right compression spring are both fixedly connected to the pull rope fixing slide block; the flapping-wing aircraft fixing part is provided with two bilaterally symmetrical through-holes, which are respectively sleeved over the left slide bar and the right slide bar; the flapping-wing aircraft fixing part abuts against the pull rope fixing slide block; the pulley shaft is fixed to the installation platform, and the pulley is sleeved over the pulley shaft; a first end of the pull rope is fixedly connected to the pull rope fixing slide block, and a second end of the pull rope passes through a round hole in the installation platform, goes around the pulley and is fixed to the winch;

the recycling mechanism comprises a recycling motor, a recycling gear transmission mechanism, elastic cloth, a recycling platform frame, a first sprocket, a second sprocket, and a recycling mechanical arm; the installation platform is provided with a plurality of through-holes for installing the recycling motor, the recycling gear transmission mechanism and the recycling mechanical arm; the recycling platform frame is a elastic steel sheet; the recycling platform frame is provided with square through-holes for meshing with the first sprocket and the second sprocket; a bottom side of the installation platform is provided with two bilaterally symmetrical d-shaped slots, and outer surfaces of front ends of the slots are both provided with boss stoppers; an edge of the elastic cloth wraps the recycling platform frame, and both ends of the elastic cloth are provided with round through-holes for being sleeved over the boss stoppers on the outer surfaces of the front ends of the d-shaped slots of the installation platform; two ends of the recycling platform frame are fixed with two left and right columns respectively through the two d-shaped slots of the installation platform; a cuboid notch is formed in the middle of each of the two d-shaped slots, and is used for the first sprocket and the second sprocket to mesh with the recycling platform frame; and the power supply module provides energy for the attitude adjusting mechanism, the catapult mechanism, the recycling mechanism, the sensor unit, and the control processor.

2. The autonomous catapult-assisted take-off, recycling, and reuse device for the flapping-wing UAV according to claim 1, wherein the attitude adjusting mechanism comprises a connector, a counterweight, a base root, an attitude adjusting motor, an attitude adjusting input gear, an attitude adjusting output gear, an attitude adjusting output gear shaft, and the installation platform, wherein a front end of the connector is installed at the top of the base, the counterweight is installed at a rear end of the connector, and the base root is installed on an upper part of the connector;

the attitude adjusting motor is installed on the base root, and the attitude adjusting input gear is fixedly connected to an output shaft of the attitude adjusting motor;

the attitude adjusting input gear meshes with the attitude adjusting output gear; the attitude adjusting output gear is fixedly connected to the attitude adjusting output gear shaft; and the attitude adjusting output gear shaft is installed on the base root through a bearing and is parallel to the output shaft of the attitude adjusting motor.

3. The autonomous catapult-assisted take-off, recycling, and reuse device for the flapping-wing UAV according to claim 1, wherein the base comprises three foot pads, three foot tubes, a foot tube restraint, a middle shaft adapter, a middle shaft locking knob, a middle shaft, a pitch adjusting handle, and a connector locking knob, wherein the three foot pads comprise a right foot pad, a left foot pad, and a rear foot pad;

the three foot tubes comprise a right foot tube, a left foot tube, and a rear foot tube;

the foot pads are respectively installed at lower ends of the corresponding foot tubes and are in contact with the ground;

three outer sleeves of the foot tube restraint are respectively connected to the three foot tubes, and an inner sleeve of the foot tube restraint is connected to a bottom end of the middle shaft adapter;

an upper end of the middle shaft adapter is connected to the three foot tubes, and a lower end of the middle shaft is sheathed in the middle shaft adapter, and the lower end of the middle shaft is fixed by the middle shaft locking knob;

an upper end of the middle shaft is connected to the pitch adjusting handle; and the pitch adjusting handle is connected to the connector locking knob.

4. The autonomous catapult-assisted take-off, recycling, and reuse device for the flapping-wing UAV according to claim 1, wherein the recycling gear transmission mechanism comprises a recycling input gear, a primary transmission gear shaft, a secondary transmission gear shaft, a first recycling output gear shaft, a second recycling output gear shaft, a primary transmission gear, a secondary transmission gear, a first recycling output gear, and a second recycling output gear, wherein the recycling input gear is installed on an output shaft of the recycling motor and meshes with the primary transmission gear;

the primary transmission gear is fixedly connected to the primary transmission gear shaft and meshes with the secondary transmission gear and the first recycling output gear;

the first recycling output gear is fixedly connected to a first end of the first recycling output gear shaft;

a second end of the first recycling output gear shaft is fixedly connected to the first sprocket;

the secondary transmission gear is fixedly connected to the secondary transmission gear shaft and meshes with the second recycling output gear;

the second recycling output gear is fixedly connected to a first end of the second recycling output gear shaft; and a second end of the second recycling output gear shaft is fixedly connected to the second sprocket.

5. The autonomous catapult-assisted take-off, recycling, and reuse device for the flapping-wing UAV according to claim 1, wherein the recycling mechanical arm comprises a first joint motor, a big arm, a second joint motor, a middle arm, a third joint motor, a small arm, a rotating motor, a gripper motor, and a gripper, wherein the first joint motor is fixed at a corresponding position of the installation platform through four round holes of a base of the first joint motor;

a first end of the big arm is fixed to an output shaft of the first joint motor, and a second end of the big arm is connected to the second joint motor;

a first end of the middle arm is fixed to an output shaft of the second joint motor, and a second end of the middle arm is connected to the third joint motor;

a first end of the small arm is fixed to an output shaft of the third joint motor, and a second end of the small arm is coaxially connected to the rotating motor;

the gripper motor is fixed to one side of the gripper; and a bottom end of the gripper is fixed to an output shaft of the rotating motor.

6. The autonomous catapult-assisted take-off, recycling, and reuse device for the flapping-wing UAV according to claim 1, wherein the sensor unit comprises an encoder, an inclination sensor, and a vision sensor, wherein the encoder is fixed at an end of the recycling motor and transmits an operating status of the recycling motor to the motor controller in real-time to realize speed regulation and start-stop of the recycling motor;

the inclination sensor is fixed to an upper surface of a base root of the attitude adjusting mechanism and is configured to collect an inclination angle of the installation platform during attitude adjustment; and the vision sensor is fixed next to a small arm of the recycling mechanical arm and is configured to detect real-time position and attitude information of the flapping-wing UAV.

7. The autonomous catapult-assisted take-off, recycling, and reuse device for the flapping-wing UAV according to claim 1, wherein the control processing unit comprises a data collection and storage unit and a processing and control processor;

a data processing unit completes collection of rotation, inclination, and visual information of the sensor unit; and the processing and control processor completes processing of data collected by the sensor unit and drives control functions of an attitude adjusting motor, the catapult motor, and a recycling motor of a system.

8. The autonomous catapult-assisted take-off, recycling, and reuse device for the flapping-wing UAV according to claim 1, wherein the base is of a tripod structure.

9. An autonomous catapult-assisted take-off, recycling, and reuse method for a flapping-wing unmanned aerial vehicle (UAV), comprising the following steps:

A) catapult angle adjustment, wherein after personnel deploy a device, a catapult mechanism is initially in a horizontal attitude; by controlling forward movement of an attitude adjusting motor, an attitude adjusting input gear, an attitude adjusting output gear, and an attitude adjusting output gear shaft are driven to rotate in turn to realize pitch attitude adjustment of an installation platform; an inclination angle of the installation platform is detected by an inclination sensor, and a rotation angle of the motor is controlled by a control processing unit, so that attitudes of the installation platform and the catapult mechanism are inclined upward, and reach a best catapult angle for the flapping-wing UAV;

B) catapult-assisted take-off, wherein after the catapult angle adjustment, a catapult motor rotates to drive a catapult input gear to rotate, the catapult input gear further drives a toothless gear to rotate, and the toothless gear drives a winch gear to rotate, and further drives a winch to rotate, thereby continuously winding a pull rope on the winch; while the pull rope is wound, a pull rope fixing slide block is driven to slide on a left slide bar and a right slide bar, thereby compressing a left compression spring and a right compression spring to store elastic potential energy; the catapult motor stops rotating when the toothless gear rotates for one circle to reach a part that does not mesh with the winch gear; driven by the elastic potential energy of the left compression spring and the right compression spring, the pull rope wound on the winch is quickly pulled apart, the pull rope fixing slide block pushes a flapping-wing aircraft fixing part to catapult, and then the catapult-assisted take-off of the flapping-wing UAV is realized;

C) attitude adjustment and recycling, wherein before the flapping-wing UAV is recycled, the attitude adjusting motor of an attitude adjusting mechanism rotates backward to adjust inclination angles of the installation platform and a recycling mechanism, so that a plane formed by a recycling platform frame and elastic cloth is obliquely downward to a certain angle, to facilitate the flapping-wing UAV to detect and land on the elastic cloth through a visual positioning method; after the flapping-wing UAV lands on the elastic cloth, the attitude adjusting mechanism adjusts an angle to make the recycling platform frame parallel to a horizontal plane; a recycling motor starts to rotate forward and drives a recycling input gear to rotate, the recycling input gear further drives a primary transmission gear to rotate, the primary transmission gear further drives a secondary transmission gear, the primary transmission gear and the secondary transmission gear respectively drive a first recycling output gear and a second recycling output gear to rotate, the first recycling output gear drives a first sprocket to rotate coaxially, and the second recycling output gear drives a second sprocket to rotate coaxially, and the recycling platform frame is continuously contracted into d-shaped slots of the installation platform, the elastic cloth is blocked by boss stoppers on outer surfaces of front ends of the d-shaped slots of the installation platform, and the flapping-wing UAV slides down to a center of the elastic cloth due to gravity; and D) take-off reloading, wherein a vision sensor captures a position of the flapping-wing UAV; a first joint motor, a second joint motor, a third joint motor, and a rotating motor of a recycling mechanical arm work at the same time; the recycling mechanical arm unfolds and rotates a gripper to adapt to an angle of the flapping-wing UAV; a gripper motor works and the gripper grabs a frame of the flapping-wing UAV on a grabbing plane and rotates the frame; and when a plane of the frame of the flapping-wing UAV and a grabbing plane of the recycling mechanical arm coincide, the gripper grabs a grabbing ring on an upper part of the frame of the flapping-wing UAV and re-sleeves the flapping-wing aircraft fixing part over the left slide bar and the right slide bar of the catapult mechanism to realize the take-off reloading.

\* \* \* \* \*